US010129420B2

(12) United States Patent
Tokumoto

(10) Patent No.: US 10,129,420 B2
(45) Date of Patent: Nov. 13, 2018

(54) IMAGE PROCESSING APPARATUS, CONTROL METHOD, AND STORAGE MEDIUM THEREOF

(71) Applicant: CANON KABUSHIKI KAISHA, Tokyo (JP)

(72) Inventor: Hirokazu Tokumoto, Kashiwa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/427,838

(22) Filed: Feb. 8, 2017

(65) Prior Publication Data
US 2017/0244847 A1 Aug. 24, 2017

(30) Foreign Application Priority Data

Feb. 19, 2016 (JP) ................................ 2016-029670

(51) Int. Cl.
H04N 1/00 (2006.01)
G06F 3/12 (2006.01)
G06K 15/02 (2006.01)

(52) U.S. Cl.
CPC ....... *H04N 1/00442* (2013.01); *H04N 1/0023* (2013.01); *H04N 1/00204* (2013.01); *H04N 1/00307* (2013.01); *H04N 1/00315* (2013.01); *H04N 2201/0039* (2013.01); *H04N 2201/0094* (2013.01)

(58) Field of Classification Search
None
See application file for complete search history.

(56) References Cited

U.S. PATENT DOCUMENTS

| 2003/0182367 A1* | 9/2003 | Ohara ................... G06F 3/1204 709/203 |
| 2004/0036903 A1* | 2/2004 | Azami ................... G06K 15/00 358/1.13 |
| 2006/0173904 A1* | 8/2006 | Nakajima ......... G06F 17/30011 |
| 2010/0017705 A1* | 1/2010 | Sato ................... H04N 1/00442 715/243 |
| 2010/0071039 A1* | 3/2010 | Kashima ............ H04N 1/00244 726/5 |
| 2010/0253964 A1* | 10/2010 | Isshiki ................. G06F 3/1203 358/1.14 |
| 2011/0179354 A1* | 7/2011 | Park ...................... G06F 3/1208 715/274 |
| 2012/0215864 A1* | 8/2012 | Fukuoka ................ G06Q 10/10 709/206 |
| 2012/0242689 A1* | 9/2012 | Miyata ...................... G06F 3/14 345/629 |

(Continued)

FOREIGN PATENT DOCUMENTS

JP 2007251279 A 9/2007
JP 4033857 B2 1/2008
(Continued)

*Primary Examiner* — Beniyam Menberu
(74) *Attorney, Agent, or Firm* — Canon U.S.A., Inc. IP Division

(57) ABSTRACT

A print data storage apparatus generates preview images for several pages in advance. A print output apparatus displays an outline of print data using the preview images to prompt a user to select print data. When the user requests further information of the print data, the print output apparatus obtains print data from the print data storage apparatus and further generates a preview image.

21 Claims, 15 Drawing Sheets

(56) References Cited

U.S. PATENT DOCUMENTS

| | | | |
|---|---|---|---|
| 2015/0049360 A1* | 2/2015 | Lee | G06F 3/1292 358/1.15 |
| 2015/0109639 A1* | 4/2015 | Ishibashi | G06F 3/1208 358/1.15 |

FOREIGN PATENT DOCUMENTS

| | | |
|---|---|---|
| JP | 2008205903 A | 9/2008 |
| JP | 2010211627 A | 9/2010 |
| JP | 2012078998 A | 4/2012 |
| JP | 2015061259 A | 3/2015 |

* cited by examiner

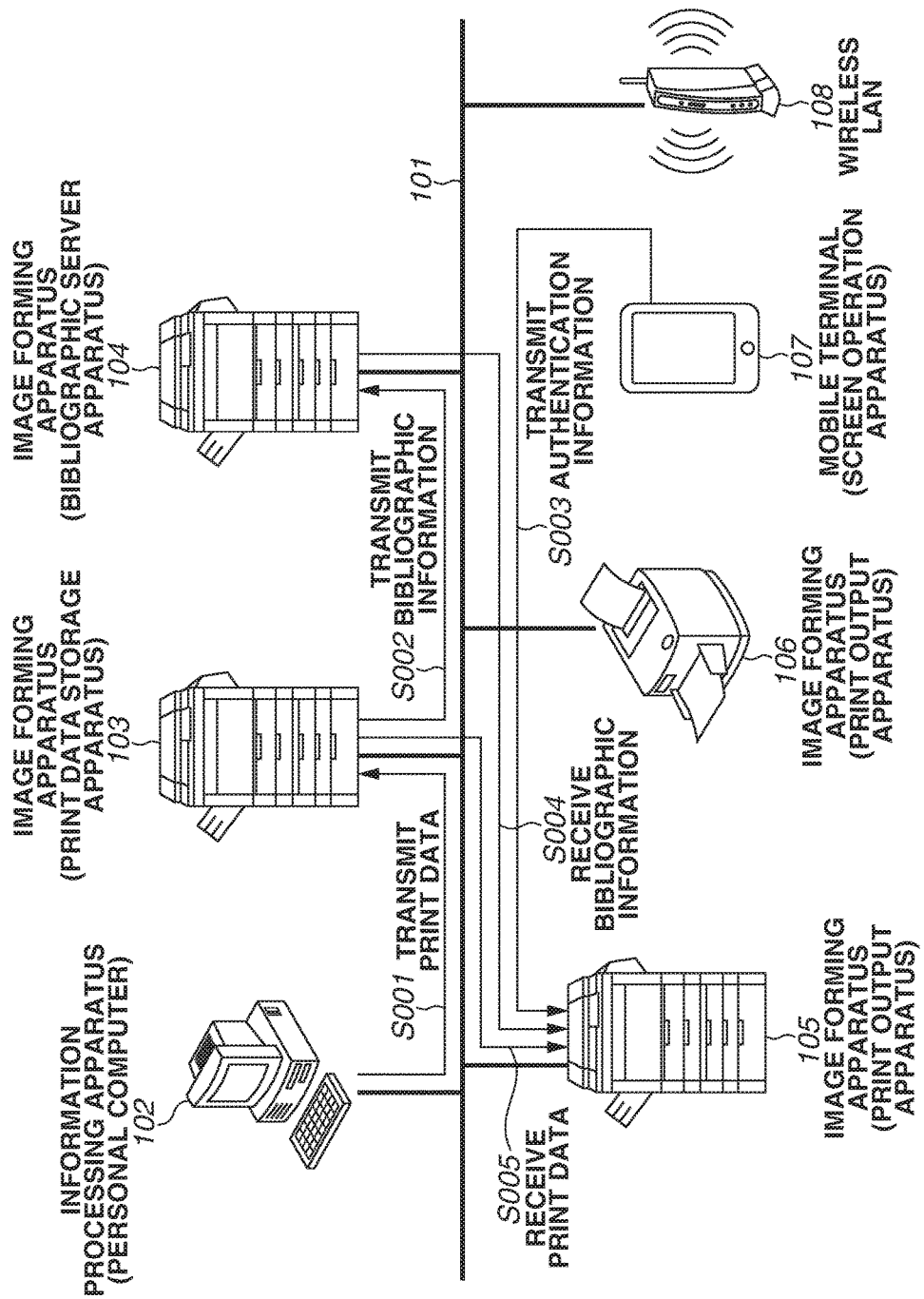

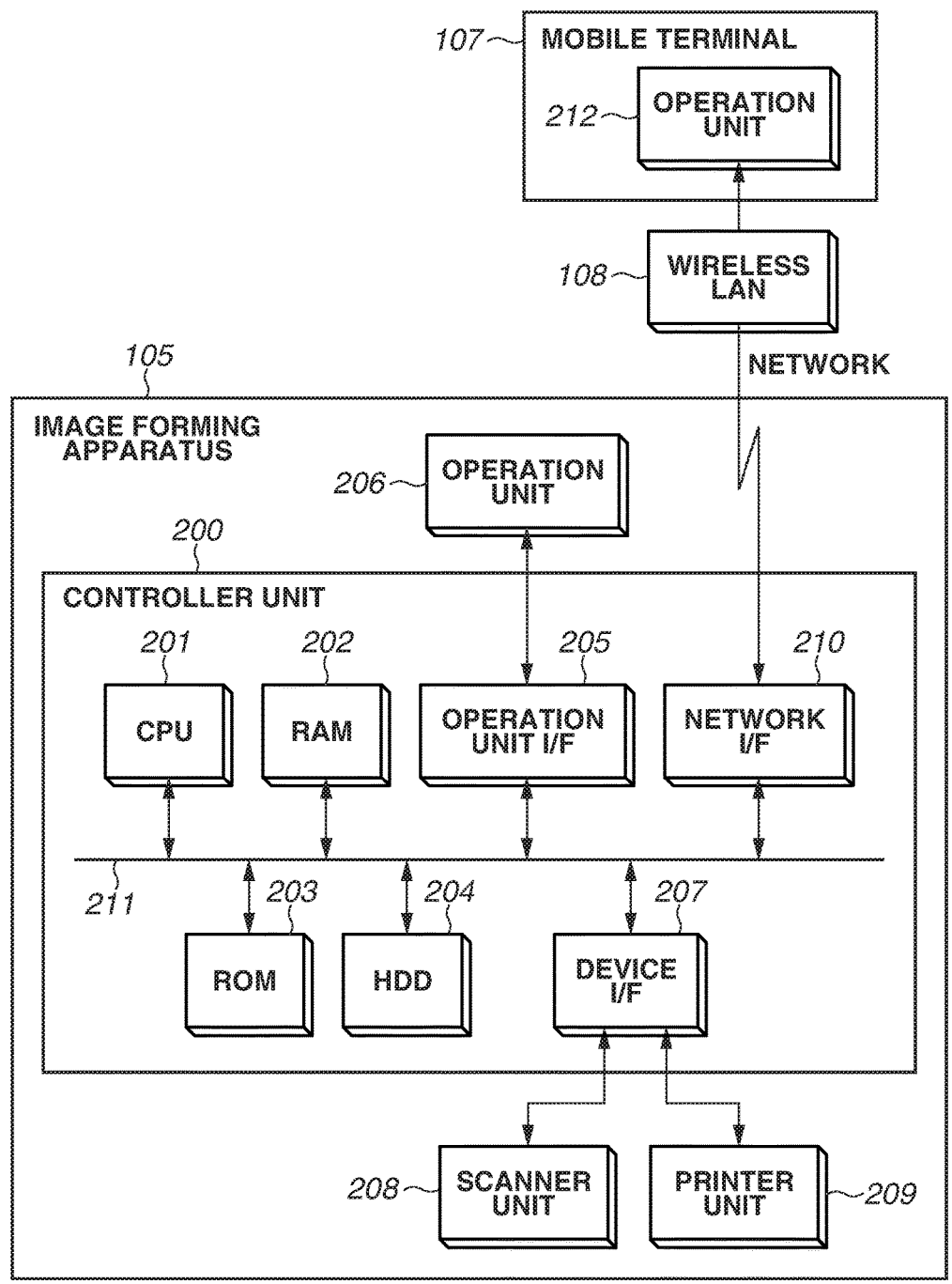

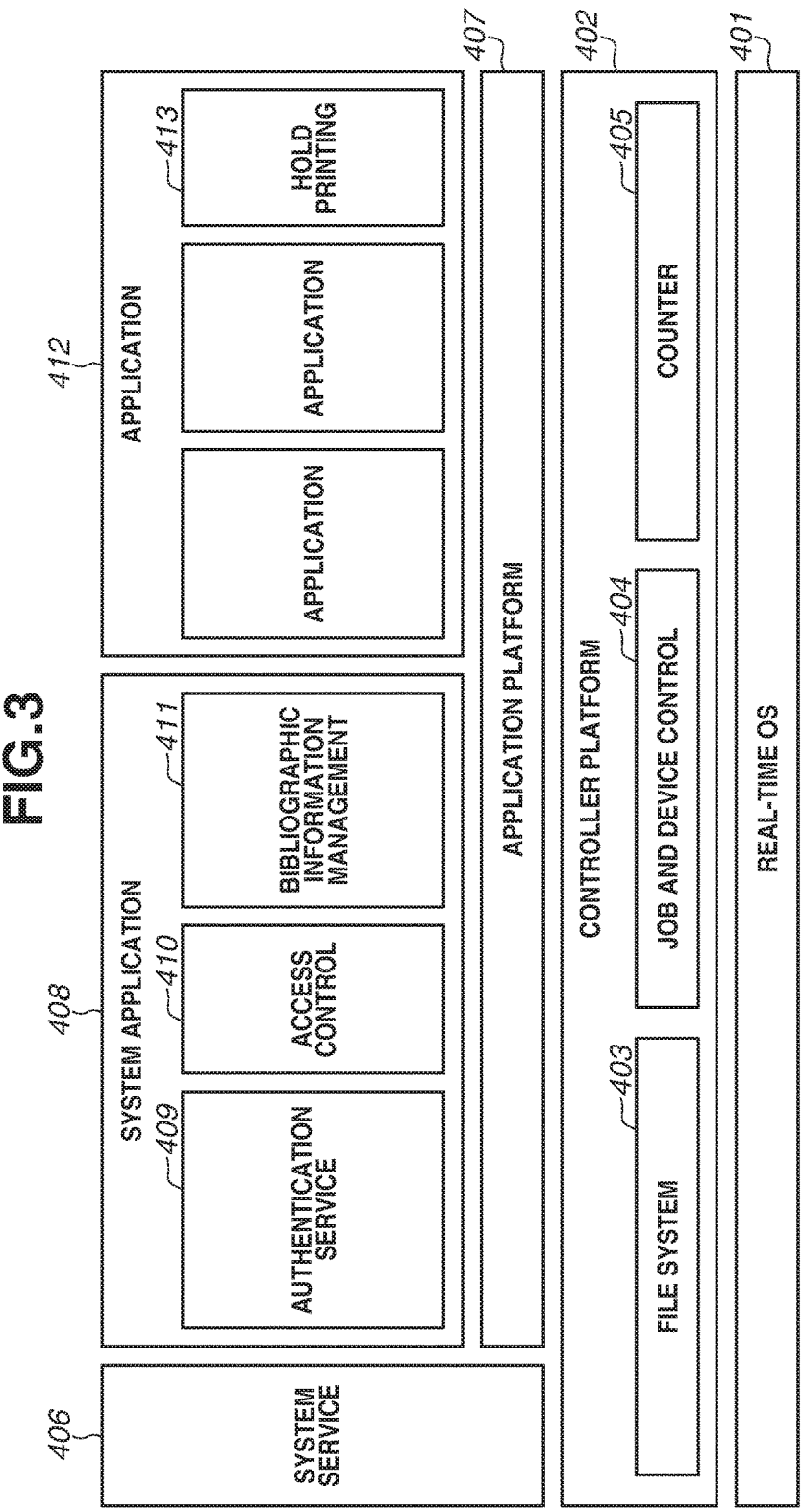

FIG.4

| | | | STORAGE LOCATION | | | PRINT SETTING | | | | |
|---|---|---|---|---|---|---|---|---|---|---|
| USER NAME | RECEIVED DATE AND TIME | IP ADDRESS | PATH | JOB NAME | SHEET SIZE | PAGE AGGREGATION | NUMBER OF PAGES | NUMBER OF COPIES | DOUBLE-SIDED | |
| sato | 2015.03.12 12:34 | localhost | /printdata/0015/xxx | index.html | A4 | 1 in 1 | 1 | 1 | SINGLE-SIDED |
| | 2015.03.11 8:30 | 192.168.0.1 | | DOCUMENT FOR REVIEW.pdf | A4 | 2 in 1 | 7 | 1 | SINGLE-SIDED |
| | 2015.03.10 17:21 | 192.168.0.2 | | PLANNING MEETING.docx | A3 | 1 in 1 | 7 | 30 | SINGLE-SIDED |
| | 2015.03.10 11:34 | 192.168.0.3 | | BUDGET MANAGEMENT.xlsx | A4 | 1 in 1 | 6 | 3 | SINGLE-SIDED |
| yamada | 2015.03.12 12:34 | localhost | /printdata/2108/www | PHOTO.jpg | A5 | 1 in 1 | 1 | 1 | SINGLE-SIDED |

300, 301, 302, 303, 304, 305, 306, 307, 308, 309, 310, 311

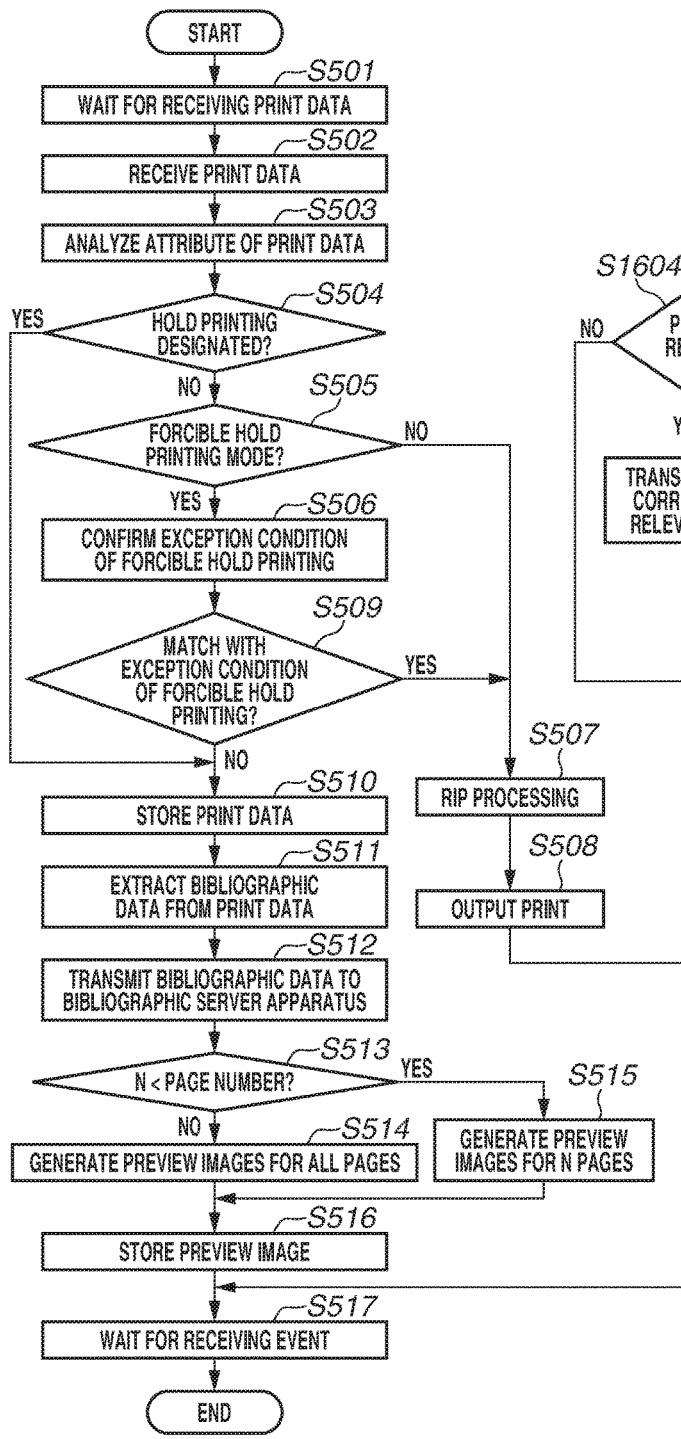

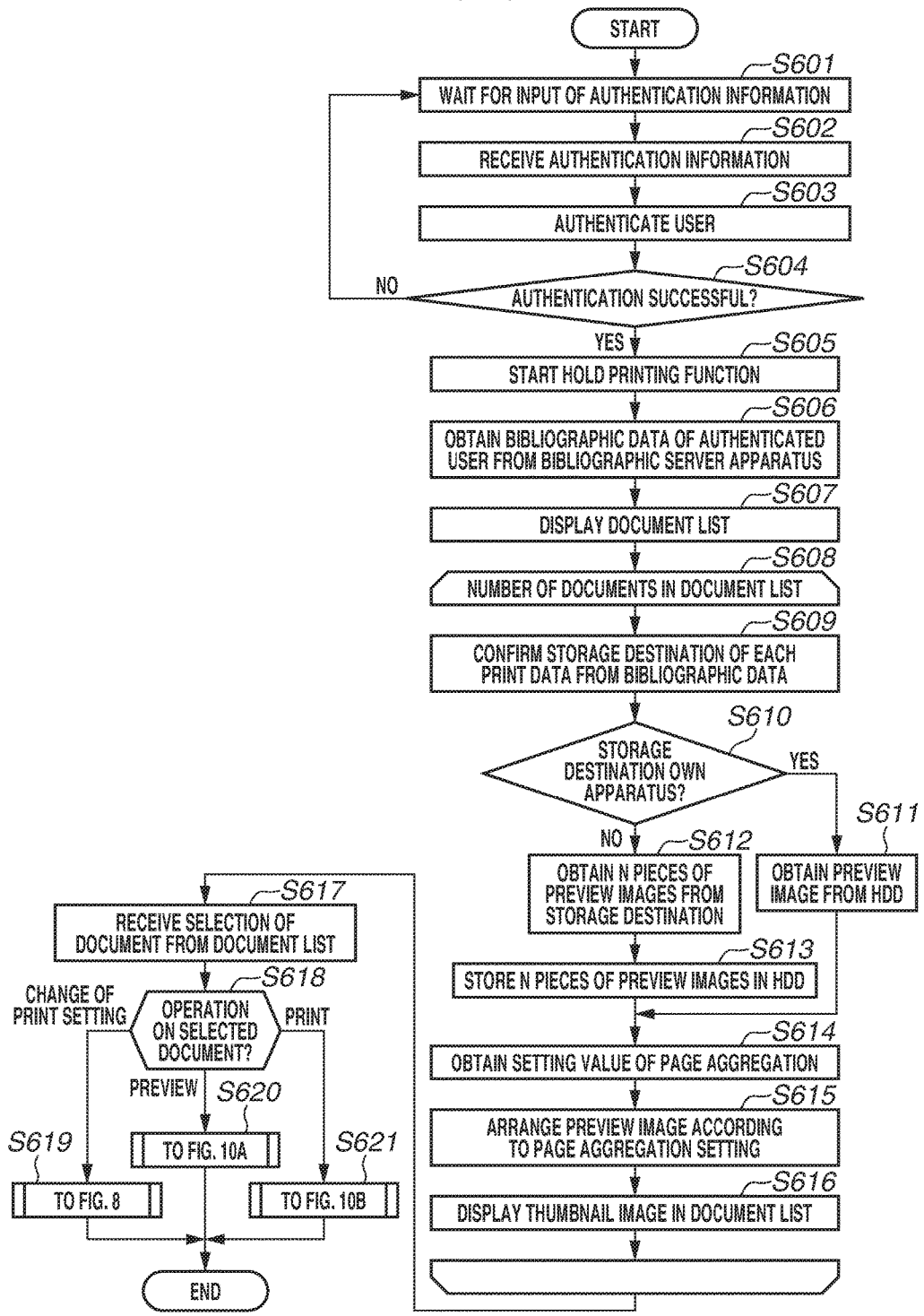

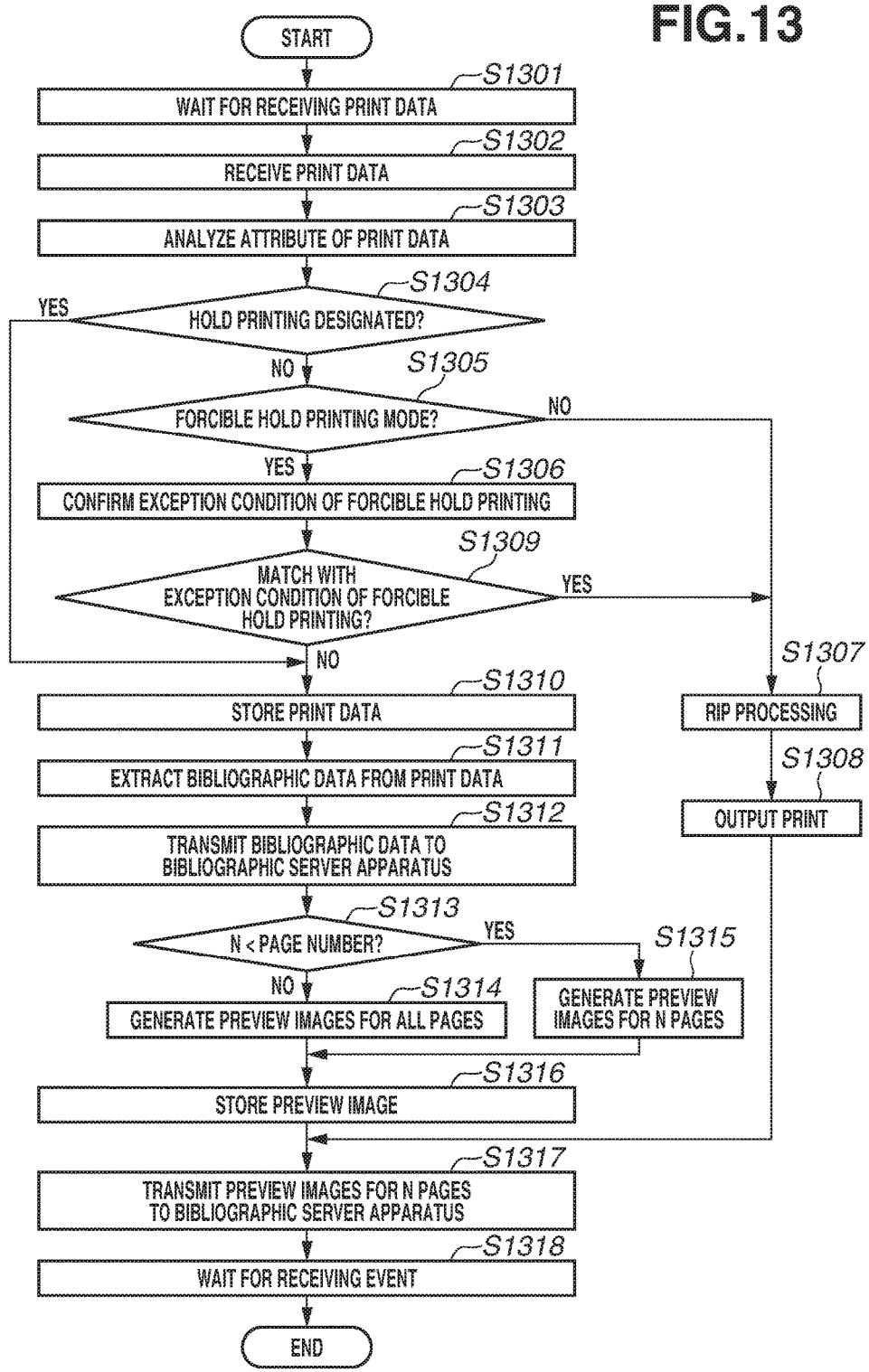

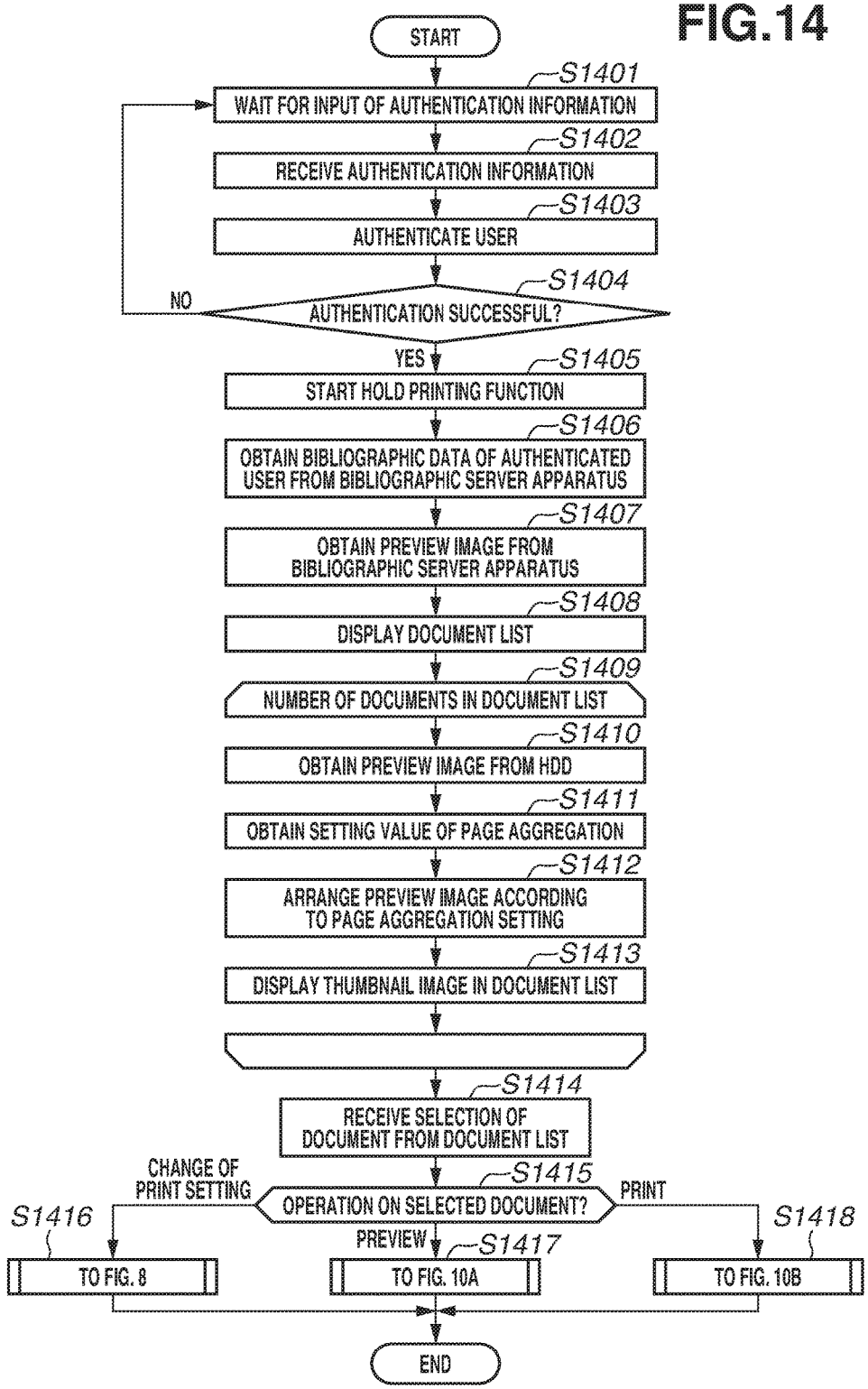

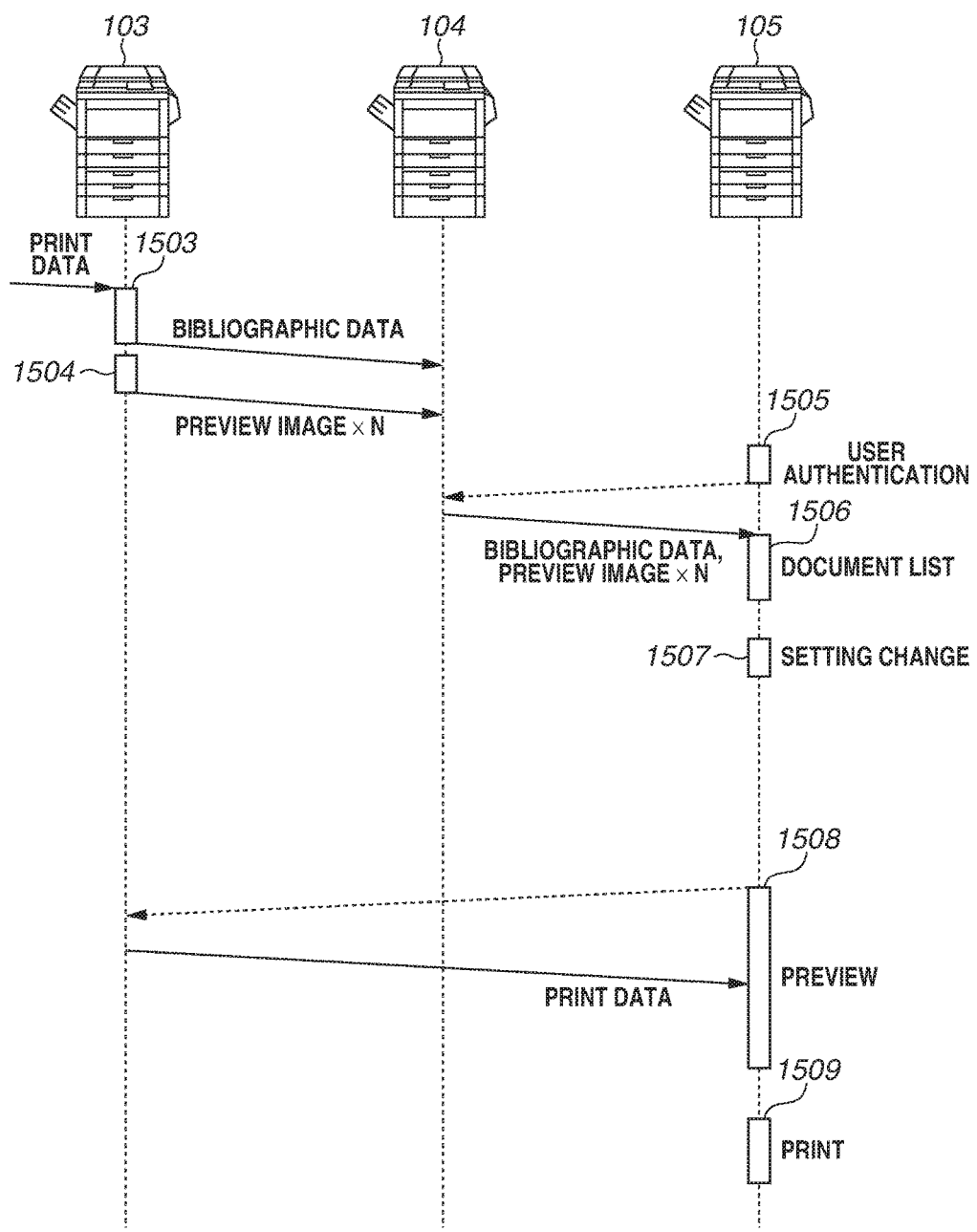

IMAGE PROCESSING APPARATUS, CONTROL METHOD, AND STORAGE MEDIUM THEREOF

BACKGROUND OF THE INVENTION

Field of the Invention

The present invention relates to an image processing apparatus handling image data. The image processing apparatus can be used in an image forming apparatus, such as a copying machine, a printer, a facsimile (FAX), and a multifunction peripheral including a plurality of these functions.

Description of the Related Art

Conventionally, copying machines, multifunction peripherals, and printers are known as image forming apparatuses for forming images on sheets. Further, recent image forming apparatuses are connected to servers via networks, and users can instruct execution of printing by specifying print data stored in the servers (Japanese Patent No. 4033857). When execution of such a "pull print" function is instructed, the image forming apparatus downloads print data from the server and starts printing.

In such systems, it is desirable for a user to be able to easily identify print data stored in a server. In a related innovative device therefor, there is a method for displaying a preview (or a thumbnail) of several pages of the print data. However, the print data necessary for generating a preview image is stored in the server and not stored in an image forming apparatus which performs the preview display. Therefore, if the image forming apparatus generates the preview image, it is necessary for the image forming apparatus to first download the print data from the server, and thus a delay occurs before the preview image can be displayed. Therefore, in an image forming system using the "pull print" function, it is desirable that the server generates preview images for several pages of the print data to be used for providing an outline of the print data and transmits the preview images to the image forming apparatus. On the other hand, it is also desirable that the image forming apparatus generates preview images of other pages to reduce the load on the server.

SUMMARY OF THE INVENTION

Various embodiments of the present disclosure are directed to the provision of an image processing apparatus capable of improving identifiability of print data stored in an external apparatus and capable of suppressing increase of a load on the external apparatus.

According to an aspect of various embodiments, an image processing apparatus capable of communicating with an external apparatus storing print data, and using a display unit for displaying information to a user, includes a controller, the controller having a processor which executes instructions stored in a memory or having circuitry, which causes the controller to be configured to obtain identification information of print data stored in the external apparatus, obtain image data corresponding to a subgroup of pages of a plurality of pages of the print data, cause the display unit to execute display processing based on the image data corresponding to the subgroup of pages, obtain the print data from the external apparatus after the display processing, generate image data, based on the print data, of a different page of the plurality of pages from the pages included in the subgroup of pages, and cause the display unit to execute display processing based on the image data of the different page.

Further features of various embodiments of the present disclosure will become apparent from the following description of exemplary embodiments with reference to the attached drawings.

BRIEF DESCRIPTION OF THE DRAWINGS

FIG. 1 illustrates a configuration of a printing system according to one embodiment.

FIG. 2 illustrates a hardware configuration of an image forming apparatus and a mobile terminal according to one embodiment.

FIG. 3 illustrates a software configuration of the image forming apparatus and the like according to one embodiment.

FIG. 4 illustrates am example of a bibliographic information management table according to one embodiment.

FIGS. 5A and 5B are flowcharts illustrating processing procedures of a print data storage apparatus according to a first exemplary embodiment according to one embodiment.

FIG. 6 is a flowchart illustrating thumbnail display processing of a print output apparatus according to a first exemplary embodiment.

FIG. 13 is a flowchart illustrating a processing procedure of a print data storage apparatus according to a second exemplary embodiment.

FIG. 14 is a flowchart illustrating thumbnail display processing of a print output apparatus according to the second exemplary embodiment.

FIG. 15 illustrates an example of a series of data flows according to the second exemplary embodiment.

DESCRIPTION OF THE EMBODIMENTS

Figure 7:
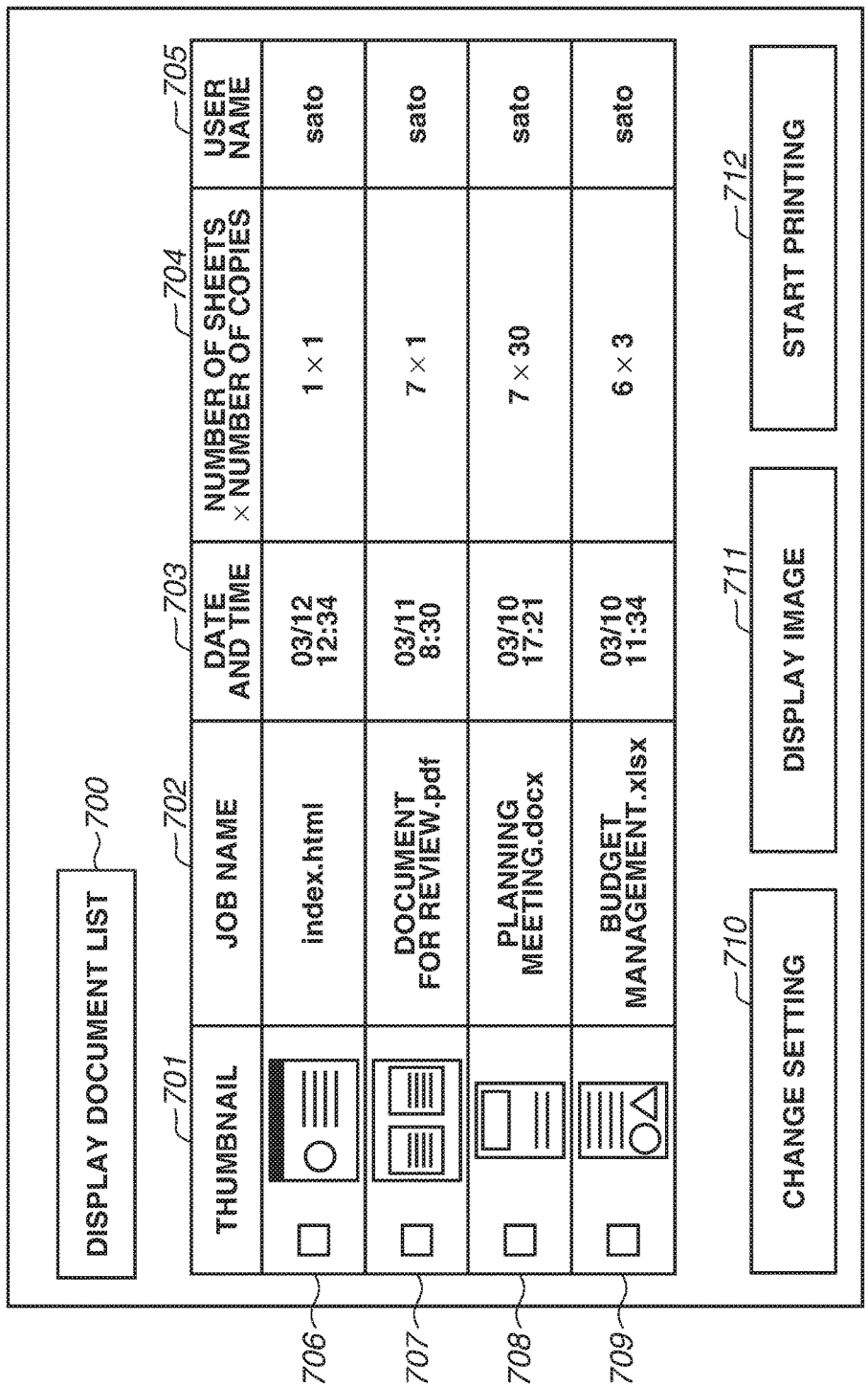
FIG. 7 illustrates an example of a document list and thumbnail display screen of the print output apparatus according to one embodiment.

Various exemplary embodiments will be described in detail below with reference to the attached drawings.

<Network Configuration>

FIG. 1 illustrates an example of a configuration of a printing system according to a first exemplary embodiment.

In FIG. 1, a network 101 supports, for example, a Transmission Control Protocol/Internet Protocol (TCP/IP) protocol. A personal computer (PC) 102, multifunction peripherals 103 to 105, a printer 106, and a wireless local-area network (LAN) device 108 are connected the network 101. In addition, a mobile terminal 107 is also connected to the same network using the wireless LAN device 108 as an access point. The multifunction peripherals 103 to 105 and the printer 106 are image forming apparatuses according to various embodiments of the present disclosure. The PC 102 is an information processing apparatus which can transmit print data to the multifunction peripheral 103 and others. The print data can be transmitted from a tablet terminal, a smartphone, and the like instead of the PC.

For example, the multifunction peripheral 103 is a print data storage apparatus which stores print data when receiving the print data from the PC 102 (in step S001) so as to perform printout or output later. The multifunction peripheral 103 extracts bibliographic information from the received print data and transmits the bibliographic information to the multifunction peripheral 104 (in step S002). The multifunction peripheral 104 is a bibliographic server apparatus which manages bibliographic information of the print data stored in the other multifunction peripherals.

The mobile terminal 107 is connected to the network 101 using the wireless LAN device 108 as the access point, can transmit authentication information to the multifunction peripheral 105 (in step S003), log into the multifunction peripheral, and remotely perform operations similar to those of an main body operation unit of the multifunction peripheral 105 from the mobile terminal 107, The mobile terminal 107 can remotely perform operations on the printer 106 therefrom in a similar manner to those of the multifunction peripheral 105. The multifunction peripheral 105 (or the printer 106) is a print output apparatus which obtains bibliographic information from the multifunction peripheral 104 acting as the bibliographic server apparatus, based on the authentication information received from the mobile terminal 107 (in step S004), receives the print data from the multifunction peripheral 103 acting as the print data storage apparatus (in step S005), and performs printout.

Needless to say, the above-described configuration is merely illustrative of a conceptual diagram of a general configuration, and a plurality of the PCs 102, the print data storage apparatuses 103, the print output apparatuses 105 and 106, and the mobile terminals 107 may be respectively included in the configuration. Further, a single multifunction peripheral can serve as at least two of the bibliographic server apparatus, the print data storage apparatus, and the print output apparatus. For example, in various embodiments, the multifunction peripherals 103 and 105, and the printer 106, can respectively function as the print data storage apparatus and the print output apparatus. In various embodiments, the multifunction peripheral 104 can function as the bibliographic server apparatus, the print data storage apparatus, and the print output apparatus.

<Schematic Configuration of Multifunction Peripherals 103 to 105, Printer 106, and Mobile Terminal 107, for Example>

FIG. 2 illustrates an example of a schematic configuration of the image forming apparatuses (the multifunction peripherals 103 to 105 and the printer 106) and the mobile terminal 107 according to the present exemplary embodiment.

A controller unit 200 is a device which controls the multifunction peripheral or the printer. A central processing unit (CPU) 201 is an arithmetic device for controlling an entire system. The CPU 201, a random access memory (RAM) 202, a read-only memory (ROM) 203, a hard disk drive (HDD) 204, an operation unit interface (I/F) 205, a device I/F 207, and a network I/F 210 are connected to a system bus 211.

The CPU 201 comprehensively controls each device connected to the system, bus 211. The RAM 202 is used as a work area of the CPU 201, and programs and data pieces of an operating system, system software, application software, and the like are also arranged therein. The ROM 203 stores a system boot program. The ROM 203 further stores a system program and an application program. In addition, the ROM 203 stores information necessary for the image forming apparatus, such as a font, in some cases. The HDD 204 stores an operating system, system, software, application software, image data, setting data, and the like.

A program stored in the RAM 202 is executed by the CPU 201 to process image data and data other than the image data stored in the RAM 202, the ROM 203, and the HDD 204. Some small multifunction peripherals may nave a hard disk-less configuration which stores the system software, the application software, and the like in the ROM 203 without mounting the HDD 204 thereon. Alternatively, a configuration may be adopted which uses a flash memory such as a solid state drive (SSD) as a storage device other than the hard disk instead of the HDD 204.

The controller unit 200 includes the operation unit I/F 205, the device I/F 207, and the network I/F 210. The operation unit I/F 205 is an interface unit to an operation unit 206 including a touch panel and outputs image data to be displayed on the operation unit 206 to the operation unit 206. The operation unit I/F 205 transmits information input by a user of the present system from the operation unit 206 to the CPU 201. An operation to the image forming apparatus according to the present exemplary embodiment can be performed not only from, the operation unit 206 but also from an operation unit 212 on the mobile terminal 107 which is communicable via the network 101 and the wireless LAN device 108.

The device I/F 207 connects a scanner unit 208 and a printer unit 209 which are image input/output devices and the controller unit 200 and performs input and output of the image data. The image data input from the scanner unit 208 via the device I/F 207 is stored in the RAM 202 and the HDD 204, Image processing is executed to the stored image data by the application program stored in the RAM 202 as necessary. When the image data is output, the image data is similarly output to the printer unit 209 via the device I/F 207. In this regard, there is a configuration which does not include the scanner unit 208 as in the case of the printer 106. The network I/F 210 is connected to the network 101 and performs input and output of image data of an external device on the network 101 or information for controlling the multifunction peripheral.

The image forming apparatus according to various embodiments is not limited to the configuration illustrated in FIG. 2, and a configuration other than that in FIG. 2 can be adopted as long as the general effects described above are satisfied. For example, in a case of a multifunction peripheral having a FAX function, the controller unit 200 may be provided with a modem, device I/F, which is not illustrated, in FIG. 2, so as to be able to perform. Fax transmission by being connected to a public line via a modem. Alternatively, for example, the controller unit 200 may be provided with a Universal Serial Bus (USB) I/F, not illustrated, so as to be able to read and print, data stored in a flash memory card and the like.

Further, the image forming apparatus according to the various embodiments may have a configuration which includes a wireless communication interface supporting a short-range wireless communication referred to as Near Field Communication (NFC) and wireless communication standards of Bluetooth (registered trademark) and the like and can communicate with the mobile terminal 107 via the wireless communication interface. In the case of this configuration, an operation to the image forming apparatus can be performed from the operation unit 212 on the mobile terminal 107 which is communicable via the above-described wireless communication interface.

<Software Configuration of Multifunction Peripheral>

FIG. 3 is a block diagram illustrating a software configuration of the image forming apparatus according to the present exemplary embodiment which is implemented in the controller unit 200. Software which is built in the multifunction peripherals 103 to 105 or the printer 106 and processed by the controller unit 200 is implemented in firmware which is stored in the ROM 203 and the like and executed by the CPU 201.

A real-time operating system (OS) 401 provides a service and a framework for managing various resources optimized for control of an embedded system for the software operating thereon. The service and the framework for managing various resources provided by the real-time OS 401 includes multi-task management which manages a plurality of execution contexts of processing by the CPU 201 and thus practically operates a plurality of processings in parallel and inter-task communication which realizes synchronization and data exchange between tasks. The service and the framework further includes memory management, interruption management, various device drivers, protocol stacks implementing various protocol processing of a local interface, a network, communication, and the like.

A controller platform 402 includes a file system 403, a job and device control 404, a counter 405, and the like.

The file system 403 is a mechanism for storing and managing data constructed on the storage device such as the HDD 204 and the RAM 202. The file system 403 is used for spooling a job handled by the controller unit 200 and storing various data pieces.

The job and device control 404 controls hardware of the multifunction peripheral or the printer and mainly controls a job using basic functions (i.e., printing, scanning, communication, image conversion, and the like) provided by the hardware.

The counter 405 manages an expiration date of each application and a counter value of printing and scanning.

A system service 406 is a module for monitoring an operating state of the multifunction peripheral or the printer and downloading software and a license from a software distribution server (not illustrated) via the network.

An application platform 407 is middleware for enabling use of the mechanisms of the real-time OS 401 and the controller platform 402 from a system application 408 and an addable application 412 which are described below.

The system application 408 includes an authentication service 409, an access control 410, a bibliographic information management 411, and the like.

The authentication service 409 performs user authentication by checking a user name and a password input via the operation unit 206 or the network with a user database stored in the HDD 204. The authentication may be performed by an external authentication server, such as the Active Directory instead of storing the user database in the HDD 204.

The access control 410 is a security module for permitting and prohibiting an access to a job and various resources based on a security setting set to a user authority and data.

The bibliographic information management 411 is a module mounted on the bibliographic server apparatus (the multifunction peripheral 104 according to the present exemplary embodiment) for managing the bibliographic information of the print data stored in the multifunction peripheral connected to the network per user. The bibliographic information includes information pieces about a document input to the multifunction peripheral to be printed, such as a received date and time of the print data, an Internet Protocol (IP) address of the multifunction peripheral or a directory path in a local device in which the print data is stored, a print data name, and a print setting. The bibliographic information includes, for example, information pieces as shown in FIG. 4 described below.

The application 412 is a module; which can display a menu on the operation unit 206, receive an input from a user, and provide various functions realized by the multifunction peripheral and the printer to the user.

A hold printing application 413 is one of the applications 412 which performs document list display for displaying a list of hold printing data pieces, determination of the hold printing when the print data is received, generation of a preview image, print output processing, and the like.

<Configuration of Bibliographic Information Management Table>

FIG. 4 is a schematic diagram illustrating an example of a bibliographic information management table according to the first exemplary embodiment.

Bibliographic information data is generated by the print data storage apparatus (for example, the multifunction peripheral 103) and transmitted to the bibliographic server apparatus (the multifunction peripheral 104). The bibliographic server apparatus 104 manages the bibliographic information data received from the print data storage apparatus 103. When login is performed, the print output apparatus (105 or 106, for example) requests and obtains the bibliographic information data corresponding to the logged in user from the bibliographic server apparatus 104.

According to the present exemplary embodiment, the multifunction peripheral 103 is regarded as the print data storage apparatus and is referred to below as the print data storage apparatus 103 for ease of description. Similarly, the multifunction peripheral 104 is regarded as the bibliographic server apparatus and referred to below as the bibliographic server apparatus 104 for ease of description. In addition, the multifunction peripheral 105 and the printer 106 are regarded as print output apparatuses and referred to as the print output apparatus 105 or 106 below for ease of description. However, it is to be understood that these configurations are examples, and as described above, the scope of the present disclosure is not limited to these configurations.

As illustrated in FIG. 4, according to one embodiment, the bibliographic information data includes a user name 300, a received date and time 303, an IP address 304, a path 305, a job name 306, a sheet size 307, page aggregation 308, a number of pages 309, a number of copies 310, and a double-sided setting 311. The received date and time 303 is a received date and time of the print data. The IP address 304 is an IP address of the image forming apparatus storing the print data. The path 305 is a directory path in which the print data is stored in the image forming apparatus for storing the print data. The job name 306 is a job name corresponding to the print data. The double-sided setting 311 indicates whether a single-sided printing setting or a double-sided printing setting.

The print settings 307 to 311 are set via a printer driver from the application on the PC 102. The bibliographic information data may include a print setting other than the print settings 307 to 311.

Items 301 and 302 respectively indicate examples of the bibliographic information data pieces corresponding to user names "sato" and "yamada".

<Print Data Transmission Procedure>

An example of a procedure for a user to transmit the print data from the PC 102 to the print data storage apparatus 103 is described next. In the below description, it is regarded that the authentication management of the print data storage apparatus 103 is performed by the authentication service 409.

According to the present exemplary embodiment, in some cases, page description language (PDL) data is transmitted as the print data to the print data storage apparatus 103. The PDL includes, for example, LIPS of Canon Inc. and PostScript of Adobe Systems Inc. In various embodiments, the print data storage apparatus 103 can perform printing by interpreting the PDL and performing raster image processor (RIP) processing. The print data is not limited to the PDL data and may be in a format which can be interpreted and printed by the print data storage apparatus 103 and the print output apparatus 105 or 106, for example, image data in a Tagged Image File Format (TIFF) and a document format of the application.

A user operates the PC 102 and starts up the printer driver from the application operating on the PC 102. The user performs the print setting from a printer driver screen not illustrated and then selects the print data storage apparatus 103 to instruct printing. The user can explicitly instruct to hold printing. When receiving the print instruction, the printer driver displays an authentication screen not illustrated. The user inputs the authentication information and then instructs printing. The printer driver transmits an authentication request to the print data storage apparatus 103 together with the user name and the password. The authentication service 409 of the print data storage apparatus 103 checks the received user name and password and returns an authentication result to the PC 102. The printer driver of the PC 102 receives the authentication result and terminates the print processing as error when the authentication has failed. On the other hand, when the authentication is successful, the printer driver converts the application data to the PDL data according to the specified print setting and generates the print data including user information. The printer-driver transmits the generated print data to the multifunction peripheral 103. When the PC 102 and the print data storage apparatus 103 exist in the same authentication domain and the authentication result of the PC 102 is guaranteed, the print data may be generated using the user information in the PC 102 without making the authentication request to the print data storage apparatus 103. Further, the print data may be generated using the user information registered in advance in the printer driver by omitting the authentication processing from the printer driver.

<Print Data Reception Processing Procedure>

FIG. 5A is a flowchart illustrating a print data reception processing procedure of the print data storage apparatus 103 according to the first exemplary embodiment. The processing in the flowcharts in FIG. 5A and FIG. 5B described below is realized by the CPU 201 of the print data storage apparatus 103 executing a program stored in the ROM 203 and the like. The flowchart in FIG. 5A includes steps S501 to S517.

First, in step S501, the job and device control 404 of the print data storage apparatus 103 waits to receive the print data. In step S502, when receiving the print data via the network I/F 210, the job and device control 404 notifies the hold printing application 413 (hereinbelow, referred to as the application 413) of the reception of the print data.

In step S503, the application 413 analyzes an attribute of the print data received in step S502.

Next, in step S504, the application 413 determines whether the hold printing is designated as an attribute of the print data. When it is determined that the hold printing is not designated as an attribute of the print data (NO in step S504), the application 413 advances the processing to step S505.

In step S505, the application 413 determines whether the apparatus on which the application 413 is executing (the print data storage apparatus 103, also referred to as the "own apparatus") is in a forcible hold printing mode. When the own apparatus is determined as not being in the forcible hold printing mode (NO in step S505), the application 413 instructs the job and device control 404 to execute printing of the print data received in step S502. In response to the instruction, the job and device control 404 executes the processing in step S507 and subsequent steps.

In step S507, the job and device control 404 performs the RIP processing according to the print setting on the PDL data included in the print data received in step S502.

Further, in step S508, the job and device control 404 performs print output by instructing the printer unit 209 to print via the device I/F 207. Then, in step S517, the application 413 is brought into an event reception waiting state.

On the other hand, in step S505, when the apparatus on which the application 413 is executing is determined to be in the forcible hold printing mode (YES in step S505), in step S506, the application 413 confirms an exception condition of the forcible hold printing of the multifunction peripheral 103.

Next, in step S509, the application 413 determines whether the print data matches with the above-described exception condition of the forcible hold printing from a type of the PDL data and print request source information included in the print data received in step S502.

In step S509, when it is determined that the print data matches with the above-described exception condition of the forcible hold printing (YES in step S509), the application 413 instructs the job and device control 404 to execute printing of the print data received in step S502. In response to the instruction, the job and device control 404 executes the processing in step S507 and the subsequent steps. The descriptions of the processing in step S507 and subsequent steps are provided above and thus omitted.

On the other hand, in step S509, when it is determined that the print data does not match with the above-described exception condition of the forcible hold printing (NO in step S509), in step S510, the application 413 stores the print data received in step S502 in the HDD 204 of the own apparatus.

Further, in step S504, when it is determined that the hold printing is designated as the attribute of the print data (YES in step S504), in step S510, the application 413 also stores the print data received in step S502 in the HDD 204 of the own apparatus.

After the processing in step S510, in step S511, the application 413 extracts the bibliographic information (bibliographic data) from the print data stored in step S510 and stores the extracted bibliographic data in the HDD 204 of the own apparatus.

Next, in step S512, the application 413 transmits a bibliographic information registration request including the above-described bibliographic data to the bibliographic server apparatus 104.

Next, in step S513, the application 413 determines whether the number of pages of the above-described print data is larger than N. N is a maximum page aggregation number which can be set to processing for performing page aggregation (processing for arranging and printing a plurality of pages in one surface of a sheet) in the multifunction peripherals 103 to 105 and the printer 106 (the image forming apparatuses which can print and output the above-described print data in the present system). For example, N is two (N=2) when the page aggregation to 2-in-1 can be performed, and N is four (N=4) when the Page aggregation to 4-in-1 can be performed. N is set in advance to the image forming apparatus which can be the print data storage apparatus and stored in the HDD 204 and the like.

In step S513, when it is determined that the number of pages of the above-described print data is larger than N (YES in step S513), the application 413 advances the processing to step S515. In step S515, the application 413 generates preview images for N pages from the above-described print data and advances the processing to step S516.

On the other hand, in step S513, when it is determined that the number of pages of the above-described print data is less than or equal to N (NO in step S513), the application 413 advances the processing to step S514. In step S514, the application 413 generates the preview images for all pages from the above-described print data and advances the processing to step S516.

In step S516, the application 413 stores the preview images generated in step S514 or S515 in the HDD 204 of the own apparatus via the file system 403 in association with the corresponding print data. A series of processing when the print data is input is terminated as described above, and in step S517, the application 413 is brought into the event reception waiting state.

In other words, the print data storage apparatus 103 generates and stores the preview images from a start page to a predetermined page (N pages) using the received print data.

<Data Obtainment Request Reception Processing Procedure>

FIG. 5B is a flowchart illustrating a reception processing procedure of a data obtainment request of the print data storage apparatus 103 according to the first exemplary embodiment. The flowchart in FIG. 5B includes steps S1601 to S1605.

First, in step S1601, when an event is newly received from the application platform 407 in the event reception waiting state, the application 413 advances the processing to step S1602.

In step S1602, the application 413 determines whether the above received event is a request for the preview image. When it is determined as the request for the preview image (YES in step S1602), the application 413 advances the processing to step S1603.

In step S1603, the application 413 obtains the preview image corresponding to the user name included in the above-described preview image request event using the storage path 305 of the bibliographic information data included in the HDD 204 and transmits the preview image to a request source of the preview image. Then, the application 413 terminates a series of processing and is again brought into the event reception waiting state.

On the other hand, in step S1602, when it is determined that the above received event is not the request for the preview image (NO in step S1602), the application 413 advances the processing to step S1604.

In step S1604, the application 413 determines whether the above received event is a request for the print data. When it is determined as the request for the print data (YES in step S1604), the application 413 advances the processing to step S1605.

In step S1605, the application 413 obtains the print data corresponding to the user name included in the above-described print data request event using the storage path 305 of the bibliographic information data included in the HDD 204 and transmits the print data to a request source of the print data. Then, the application 413 terminates the series of processing and is again brought into the event reception waiting state.

On the other hand, in step S1604, when it is determined that the above received event is not the request for the print data (NO in step S1604), the application 413 terminates the series of processing when receiving the event and is again brought into the event reception waiting state.

<Descriptions of Document List and Thumbnail Display Screen>

FIG. 7 illustrates an example of a display screen of the document list and the thumbnail of the print output apparatus 105 or 106 according to the first exemplary embodiment. The screen is displayed by the application 413 executed in the CPU 201 of the print output apparatus 105 or 106 on the operation unit 206 of the own apparatus or on the operation unit 212 of the mobile terminal 107 on which the similar operation and display can be remotely performed.

In FIG. 7, a document list which can be printed is displayed on a document list screen 700 to the authenticated user. In the example in FIG. 7, there are four printable document lists (706 to 709). Further, five items are displayed for each document displayed in the document list screen 700, namely a thumbnail 701, a job name 702, date and time 703, a number of pages (a number of sheets), a number of copies 704, and a user name 705.

The thumbnail 701 is used for identifying an input document and is more explicit than the job name. The items displayed with respect to each document list are handled as the bibliographic information and overall managed by the bibliographic server apparatus 104, however, the preview image used for the thumbnail is large in size, so that the preview image is not handled as the bibliographic information according to the first exemplary embodiment. An image displayed in the thumbnail is the one to which the print setting of the job is reflected. In the example of a thumbnail of a document 707, the 2-in-1 page aggregation is reflected.

The application 413 has functions corresponding to a selling change button 710, a screen display button 711, and a print start button 712 with respect to the documents (706 to 709).

In the case of the configuration in which the mobile terminal 107 displays the operation screen, the preview image to which the print setting is reflected is generated by the print output apparatus 105 or 106 and transmitted to the mobile terminal 107 wirelessly or otherwise.

<Document List and Thumbnail Display Processing Procedure>

FIG. 6 is a flowchart illustrating display processing procedures of the document list and the thumbnail of the print output apparatus 105 or 106 according to the first exemplary embodiment. The processing in the flowcharts in FIG. 6, FIG. 8, and FIGS. 10A and 10B described below are realized by the CPU 201 of the print output apparatus 105 or 106 executing a program stored in the ROM 203 and the like. The flowchart in FIG. 6 includes steps S601 to S621. A case is described here as an example in which an operation is performed from the operation unit 206 of the print output apparatus 105 or 106, however, the same can be applied to a case when the print output apparatus 105 or 106 is operated from the mobile terminal 107.

First, in step S601, the authentication service 409 of the print output apparatus 105 or 106 displays an authentication screen not illustrated and waits for an input of the authentication information. In step S602, when the authentication service 409 receives the authentication information input by the user from the operation unit 206 via the operation unit I/F 205, in step S603, the authentication service 409 performs the user authentication based on the authentication information. In step S604, the authentication service 409 determines whether the authentication is successful. When it is determined that the authentication has failed (NO in step S604), the authentication service 409 returns the processing to step S601 and waits for an input of the authentication information.

On the other hand, when it is determined that the authentication is successful (YES in step S604), the authentication service 409 notifies the applications 412 and 413 of the authentication result.

In step S605, when the authenticated user selects the hold printing function of the application 413, the hold printing function of the application 413 is started.

Next, in step S606, the application 413 makes a request to obtain the bibliographic data corresponding to the authenticated user to the bibliographic server apparatus 104 and obtains the bibliographic data corresponding to the authenticated user from the bibliographic server apparatus 104. In other words, the print output apparatus obtains the bibliographic information corresponding to the user currently logged in the print output apparatus from the bibliographic server apparatus.

In step S607, the application 413 displays the document list to be a print target (the document list as shown in FIG. 7) on the operation unit 206 based on the bibliographic data obtained in step S606. At this time point, the thumbnail of each document in the document list is not displayed yet, and the application 413 waits in a state for waiting to read a thumbnail image.

Next, in step S608, the application 413 controls the processing in steps S609 to S616 to repeat times of the number of documents in the document list. The processing is described in detail below.

In step S609, the application 413 obtains a document which is not yet processed in the document list (hereinbelow, the relevant document) and confirms a storage destination of the print data corresponding to the relevant document from, a storage location (304 to 306) of the bibliographic data.

Next, in step S610, the application 413 determines whether the storage destination of the print data corresponding to the relevant document is the print output apparatus itself (the apparatus on which the application 413 is running, that is, the own apparatus). When it is determined to be the own apparatus (YES in step S610), the application 413 advances the processing to step S611. In step S611, the application 413 reads the preview images for N pages of the relevant document from the HDD 204 of the own apparatus via the file system 403 and advances the processing to step S614.

On the other hand, in step S610, when it is determined that the storage destination of the print data corresponding to the relevant document is not the own apparatus (NO in step S610), the application 413 advances the processing to step S612. In step S612, the application 413 communicates with the print data storage apparatus 103 corresponding to the storage destination (the storage location (304 to 306) of the bibliographic data) of the print data corresponding to the relevant document and obtains the preview images for N pages of the relevant document. Further, in step S613, the application 413 writes the obtained preview images for N pages of the relevant document to the HDD 204 via the file system 403 and advances the processing to step S614.

In step S614, the application 413 obtains a setting value of the page aggregation from the bibliographic data of the relevant document. Next, in step S615, the application 413 lays out the preview images of the relevant document based on the setting value of the page aggregation obtained in step S614. For example, when 2-in-1 is set to a portrait document, two preview images are arranged side by side as in the thumbnail of the document 707 in FIG. 7. Next, in step S616, the application 413 displays the thumbnail image on the document list based on the layout arranged in step S615. The application 413 returns the processing to step S608 and performs control to process the document not yet processed.

When determining that the series of processing from step S609 to step S616 has performed on all documents in the document list, the application 413 advances the processing to step S617.

In step S617, the application 413 receives a selection operation (selection by the user) of the document from the document list. When it is determined that the user selects the document from the document list, and an operation is performed on the selected document, the application 413 advances the processing to step S618.

In step S618, the application 413 determines the operation on the document selected by the user. When the operation on the selected document is the print setting change (an operation corresponding to the setting change button 710) ("CHANGE OF PRINT SETTING" in step S618), the application 413 advances the processing to step S619. In step S619, the application 413 executes the processing described below with reference to FIG. 8 and terminates the series of processing in the present flowchart.

Further, in step S618, when the operation on the selected document is preview (an operation corresponding to the screen display button 711) ("PREVIEW" in step S618), the application 413 advances the processing to step S620. In step S620, the application 413 executes the processing described below with reference to FIG. 10A and terminates the series of processing in the present flowchart.

Further, in step S618, when the operation on the selected document is print (an operation corresponding to the print start button 712 in FIG. 7) ("PRINT" in step S618), the application 413 advances the processing to step S621. In step S621, the application 413 executes the processing described below with reference to FIG. 10B and terminates the series of processing in the present flowchart.

<Description of Setting Change Screen>

Figure 9:
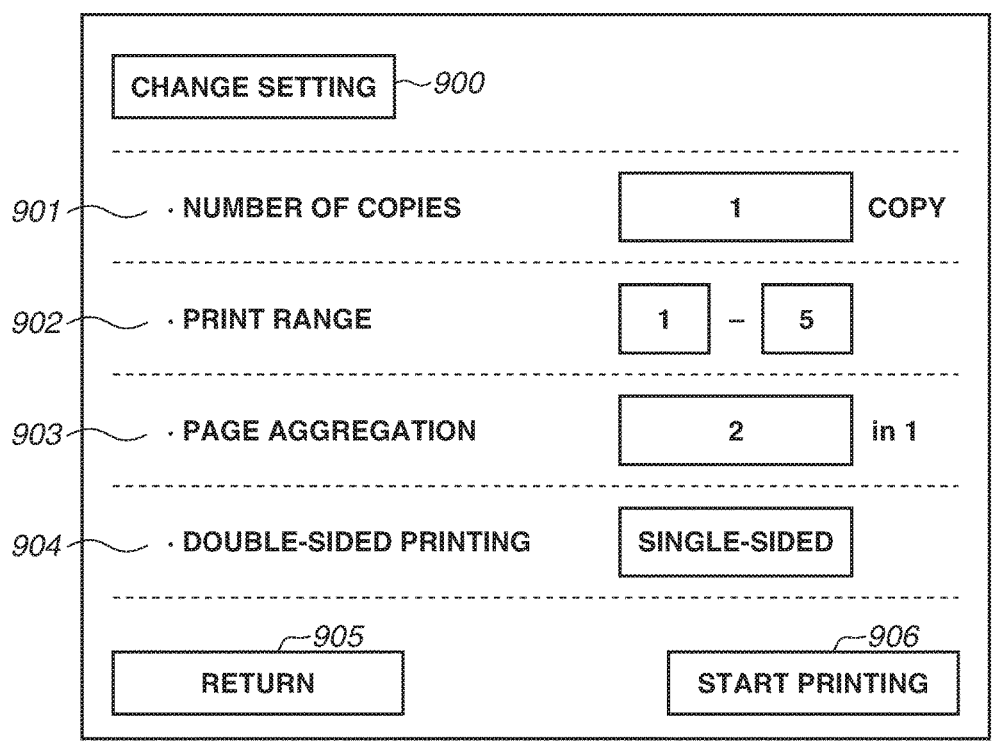
FIG. 9 illustrates an example of a setting change screen of the print output apparatus according to the first exemplary embodiment.

FIG. 9 illustrates an example of a setting change screen of the print output apparatus 105 or 106 according to the first exemplary embodiment. The screen is displayed by the control of the application 413 executed in the CPU 201 of the print output apparatus 105 or 106 on the operation unit 206 of the print output apparatus 105 or 106 or on the operation unit 212 of the mobile terminal 107 on which similar operation and display can be remotely performed. The print output apparatus 105 is used in the description, however, the same can be applied to the print output apparatus 106. Further, the operation unit 206 of the print output apparatus 105 is used in the description, however, the same can be applied to the operation unit 206 of the print output apparatus 106.

When the user presses the setting change button 710, the application 413 of the print output apparatus 105 receives a transition event from the application platform 407 to the setting change screen and displays and controls a setting change screen 900 on the operation unit 206 of the print output apparatus 105.

The screen includes four: setting-changeable items, namely a number of copies 901, a print range 902, page aggregation 903, and double-sided printing 904. These setting-changeable items are initially displayed with contents set in the PC 102. The application 413 provides the user with functions of which settings can be changed after holding the print data in the print output apparatus 105 and thus improves user convenience.

The user changes the setting on the screen and then presses a return button 905, and thus the screen is shifted to the document list screen 700. In this case, the thumbnail 701 on the document list screen 700 is displayed to which the setting changed content on the screen in FIG. 9 is reflected. In addition, when the user presses the print start button 712 after changing the setting, printing can be performed to which the setting change is reflected. In the case of the configuration in which the mobile terminal 107 displays the operation screen in FIG. 9, information of the setting change and a print start instruction are transmitted from the mobile terminal 107 to the image forming apparatus 105 or 106 wirelessly or otherwise.

<Setting Change Processing Procedure>

Figure 8:
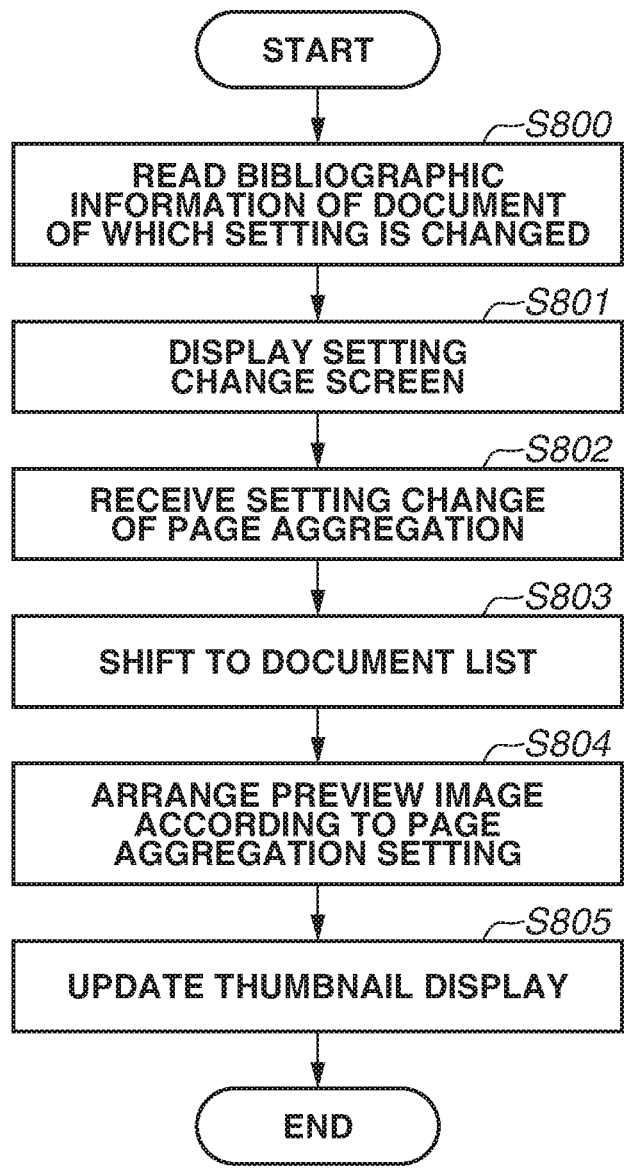
FIG. 8 is a flowchart illustrating a setting change processing procedure of the print output apparatus according to the first exemplary embodiment.

FIG. 8 is a flowchart illustrating a setting change processing procedure (step S619 in FIG. 6) of the print output apparatus 105 or 106 according to the first exemplary embodiment. The flowchart in FIG. 8 includes steps S800 to S805.

First, in step S800, the application 413 of the print output apparatus 105 or 106 reads the bibliographic data of the document of which the setting is changed (namely the document selected on the screen in FIG. 7). Next, in step S801, the application 413 displays and controls the setting change screen 900 in FIG. 9 on a display unit of the operation unit 206 of the own apparatus or the operation unit 212 of the mobile terminal 107 based on the bibliographic data read in step S800.

When the user changes the setting of the page aggregation 903, in step S802, the application 413 receives a page aggregation setting change event from the application platform 407. The application 413 updates the bibliographic data with a received value of the page aggregation.

It is not illustrated that, when the user presses a print start button 906, the application 413 executes the processing illustrated in FIG. 10B described below.

When the user presses the return button 905, in step S803, the application 413 receives a transition event from the application platform 407 to the document list screen and shifts the screen to the document list in FIG. 7.

Next, in step S804, the application 413 arranges the preview image in accordance with the page aggregation setting in the changed bibliographic information. For example, when 1-in-1 is changed to 2-in-1, the preview images of two pages are arranged side by side as in the thumbnail of the document 707 in FIG. 7.

Next, in step S805, the application 413 displays the preview image arranged in step S804 in the thumbnail 701 in the document list screen 700 and terminates the processing in the present flowchart.

<Descriptions of Preview Display Screen>

Figure 11:
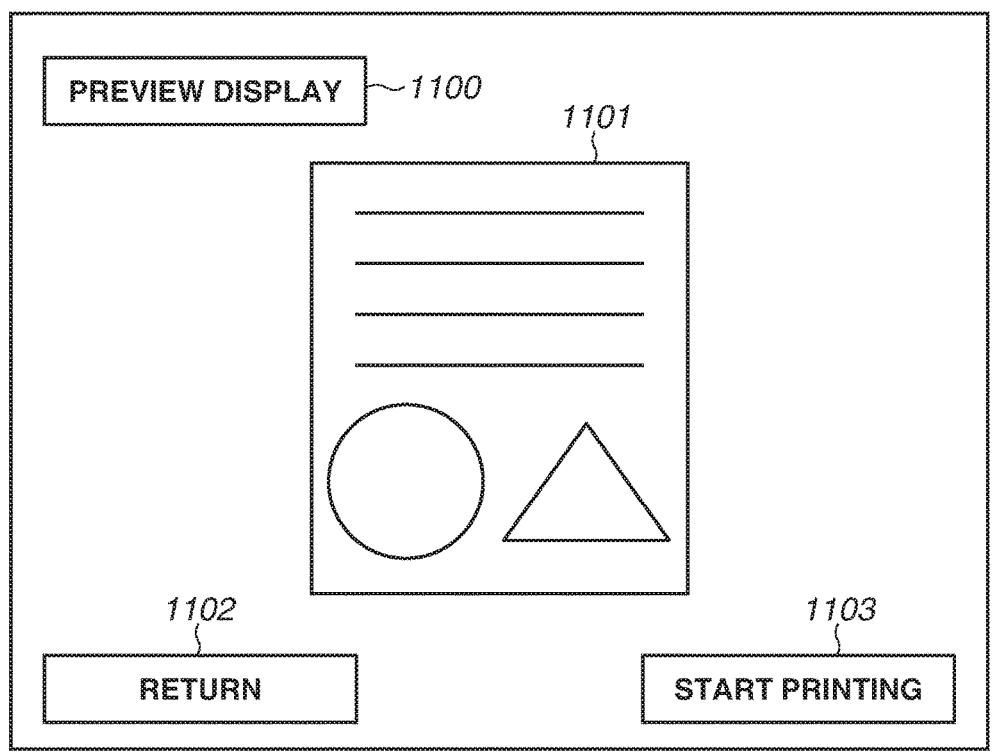
FIG. 11 illustrates an example of a preview display screen of the print output apparatus according to the first exemplary embodiment.

FIG. 11 illustrates an example of the preview display screen of the print output apparatus 105 or 106 according to the first exemplary embodiment. The screen is displayed, when the user presses the screen display button 711 in FIG. 7, by the control of the application 413 executed in the CPU 201 of the print output apparatus 105 or 106 on the operation unit 206 of the print output apparatus 105 or 106 or on the operation unit 212 of the mobile terminal 107 on which similar operation and display can be remotely performed. The print output apparatus 105 is used in the description, however, the same can be applied to the print output apparatus 106. Further, the operation unit 206 of the print output apparatus 105 is used in the description, however, the same can be applied to the operation unit 206 of the print output apparatus 106.

When the user presses the screen display button 711, the application 413 of the print output apparatus 105 receives a transition event from the application platform 407 to a preview screen and performs control to display a preview display screen 1100 on the operation unit 206 of the print output apparatus 105.

The preview display screen 1100 is a screen for displaying the preview image of the selected document to the authenticated user. According to the present exemplary embodiment, the preview display screen can display two pages, and in the example in FIG. 11, a preview image 1101 of a first page is displayed. When performing a flick operation on the screen, the user can display and confirm the preview image of a next page.

The application 413 has functions corresponding to a return button 1102 to the document list display and a print start button 1103 with respect to the preview-displayed document.

In the case of the configuration in which the operation unit 212 of the mobile terminal 107 displays the operation screen, the preview image is generated by the print output apparatus 105 or 106, and the generated preview image is transmitted to the mobile terminal 107 by wirelessly and the like.

<Preview Processing Procedure>

Figure 10A:
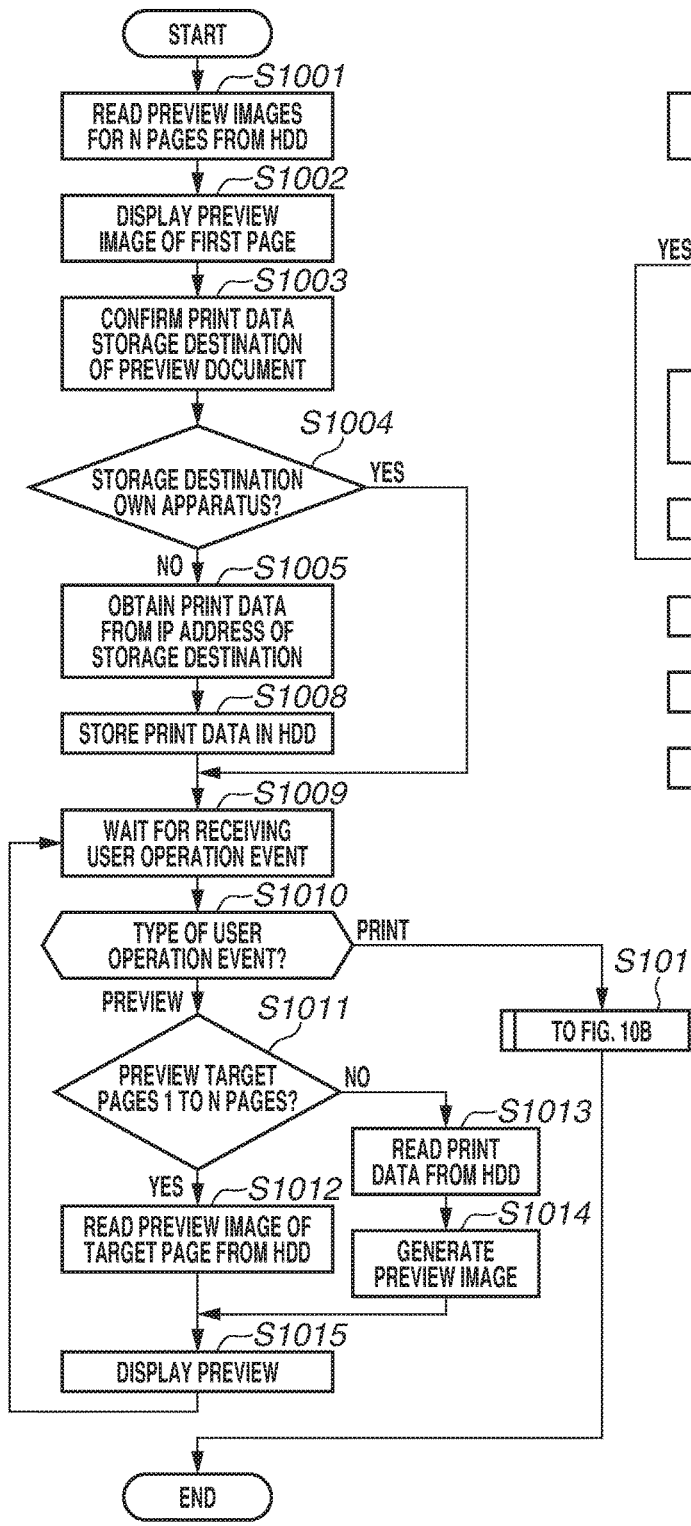
FIGS. 10A and 10B are flowcharts illustrating preview and print processing procedures of the print output apparatus according to the first exemplary embodiment.

FIG. 10A is a flowchart illustrating a preview-processing procedure of the print output apparatus 105 or 106 according to the first exemplary embodiment. The flowchart in FIG. 10A includes steps S1001 to S1015.

In step S1001, the application 413 of the print output apparatus 105 or 106 reads the preview images for N pages (for example, the ones obtained from the print data storage apparatus 103 in step S612 in FIG. 6) from the HDD 204 via the file system 403.

Next, in step S1002, the application 413 shifts the screen from the document list screen 700 to the preview display screen 1100 and displays the preview images read in step S1001 on the screen.

Next, in step S1003, the application 413 performs an operation for confirming whether the storage destination of the previewed document matches with the apparatus on which the application 413 currently is executing (i.e., the own apparatus) on the background of the display operation of the preview display screen.

When it is determined that the storage destination is not (does not match with) the own apparatus (NO in step S1004), the application 413 advances the processing to step S1005.

In step S1005, the application 413 obtains the IP address of the storage destination of the print data from the bibliographic information of the preview-displayed document and communicates with an apparatus as the storage destination using the IP address to obtain the print data of the document.

Next, in step S1008, the application 413 stores the print data obtained in step S1005 in the HDD 204. As described above, the print data is obtained in advance when the first page is preview-displayed. Then, the application 413 advances the processing to step S1009.

On the other hand, in step S1004, when it is determined that the storage destination of the previewed document is (matches with) the own apparatus (YES in step S1004), the application 413 directly advances the processing to step S1009.

In step S1009, the application 413 is shifted to a user operation event reception waiting state. When receiving the user operation event, in step S1010, the application 413 determines a type of the event.

When the event is determined as a print request ("PRINT" in step S1010), in step S1016, the application 413 executes the processing described below with reference to FIG. 10B and terminates the processing in the present flowchart.

Further, in step S1010, when the event is determined as a preview request ("PREVIEW" in step S1010), the application 413 advances the processing to step S1011.

In step S1011, the application 413 determines whether preview target pages are one to N pages.

When it is determined that the preview target pages are not one to N pages (NO in step S1011), the application 413 advances the processing to step S1013.

In step S1013, the application 413 reads the print data of the preview display target page from, the HDD 204, and in step S1014, the application 413 generates the preview image using the print data. In FIG. 10A, the configuration is described in which the print data is obtained in advance from the print, data storage apparatus 103 in step S1005. However, the print data may be obtained from the print data storage apparatus 103 in step S1013, and the preview image may be generated in step S1014. In other words, when a preview instruction of an N+1 page or later is issued, the preview image may be generated by obtaining the print data.

On the other hand, in step S1011, when it is determined that the preview target pages are one to N pages (YES in step S1011), the application 413 advances the processing to step S1012. In step S1012, the application 413 reads the preview images of the preview display target pages from the HDD 204.

After the processing in step S1012 or S1014, in step S1015, the application 413 displays the preview images using the images read in step S1012 or generated in step S1014 and terminates the series of processing.

<Print Processing Procedure>

Figure 10B:
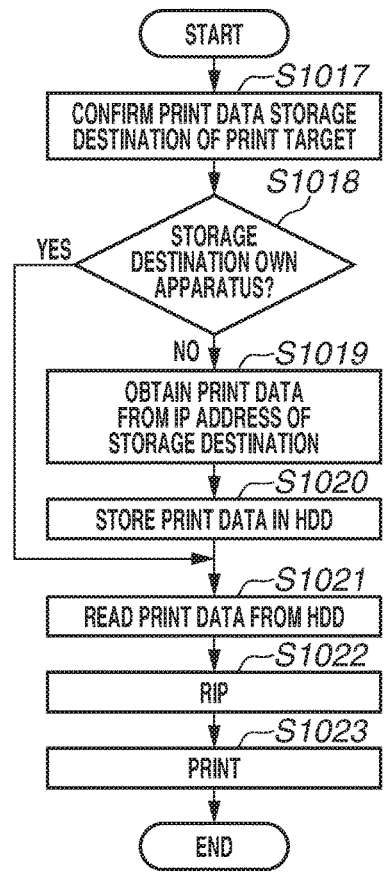

FIG. 10B is a flowchart illustrating a print processing procedure of the print output apparatus 105 or 106 according to the first exemplary embodiment. The flowchart in FIG. 10B includes steps S1017 to S1021.

In step S1017, the application 413 confirms the storage destination of the print data of the document to be printed from the bibliographic information.

Next, in step S1018, the application 413 determines whether the storage destination of the above-described print data is the own apparatus.

When it is determined that the storage destination of the above-described print data is not the own apparatus (NO in step S1018), the application 413 advances the processing to step S1019.

In step S1019, the application 413 communicates with the apparatus as the storage destination of the above-described print data based on the IP address of the storage destination of the above-described print data to obtain the above-described print data. Next, in step S1020, the application 413 stores the print data obtained in step S1019 in the HDD 204 of the own apparatus and advances the processing to step S1021.

On the other hand, in step S1018, when it is determined that the storage destination of the above-described print data is the own apparatus (YES in step S1018), the print data is in the HDD 204 of the own apparatus, so that the application 413 directly advances the processing to step S1021.

In step S1021, the application 413 reads the print data of the document to be printed from the HDD 204 of the own apparatus, and in step S1022, the application 413 performs the RIP processing on the print data and generates an output image (image data). Further, in step S1023, the application 413 issues a print start request with respect to the image data subjected to the RIP processing in step S1022 to the job and device control 404. The job and device control 404 instructs the printer unit 209 to print and output the image data subjected to the RIP processing via the device I/F 207 in response to the print start request. Accordingly, the processing in the present flowchart is terminated.

<Data Flow>

Figure 12:
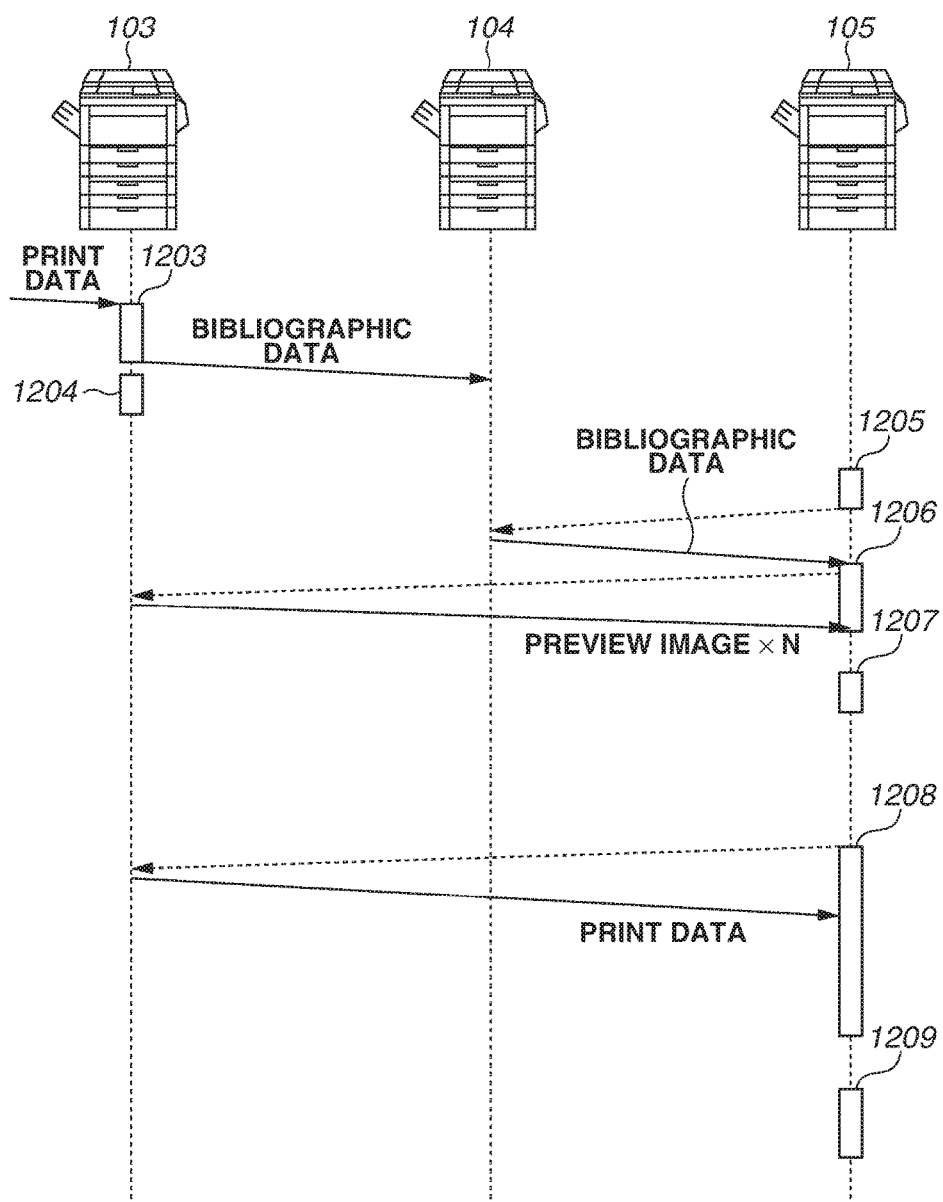
FIG. 12 illustrates an example of a series of data flows according to the first exemplary embodiment.

FIG. 12 illustrates an example of a series of data flows according to the first exemplary embodiment which is performed when data is exchanged among three apparatuses, namely the print data storage apparatus 103, the bibliographic server apparatus 104, and the print output apparatus 105. The print output apparatus 105 is used in the description, however, the same can be applied to the print output apparatus 106.

When the print data storage apparatus 103 receives the print data transmitted from the PC 102, in step 1203, the application 413 operating on the CPU 201 of the print data storage apparatus 103 generates the bibliographic data from the received print data. Further, the application 413 transmits the generated bibliographic data to the bibliographic server apparatus 104.

In step 1204, the application. 413 of the print data storage apparatus 103 generates the preview images for N pieces from the above-described received print data.

In step 1205, the authentication service 409 operating on the CPU 201 of the print output apparatus 105 performs the user authentication, and then the application. 413 operating on the CPU 201 of the print output apparatus 105 requests and obtains the bibliographic data corresponding to the authenticated user from the bibliographic server apparatus 104.

In step 1206, the application 413 of the print output apparatus 105 displays the document list using the bibliographic data obtained from the bibliographic server apparatus 104. The application 413 of the print output apparatus 105 obtains N pieces of the preview images generated by the print data storage apparatus 103 in step 1204 from the print data storage apparatus 103 for the thumbnail display.

Further, the application 413 of the print output apparatus 105 controls the setting of the document to be printed so as to be changeable. In step 1207, when the user instructs the setting change of the document, the application 413 of the print output apparatus 105 executes the setting change based on the instruction and performs control so that the thumbnail corresponding to the changed page aggregation setting is displayed when the display is returned to the document list screen after the setting change.

Further, the application 413 of the print output apparatus 105 controls the preview of the document to be printed so as to be changeable. In step 1208, when a preview instruction is received from the user, the application 413 performs the preview display. The preview display of one to N pages can be performed by the preview images obtained in step 1206, however, it is necessary to generate the preview images for the preview of the subsequent pages. Therefore, the application 413 of the print output apparatus 105 obtains the print data from the print data storage apparatus 103 at a timing of the preview display and performs control to generate and display the preview images after the N page.

Further, the application 413 of the print output apparatus 105 controls the document to be printable. In step 1209, when a print instruction of the document is received from the user, the application 413 of the print output apparatus 105 executes printing. Since the print data is already obtained in step 1208, there is no need to newly obtain the print data from the print data storage apparatus, and printing can be executed using the print data existing in the print output apparatus 105. When the print data is not yet obtained, the application 413 of the print output apparatus 105 obtains the print data from the print data storage apparatus 103 and executes printing.

As described above, the first exemplary embodiment is configured in which the print data storage apparatus 103 which receives the print data from the PC and the like generates and stores preview images for a necessary minimum pages in advance when receiving the print data and transmits the preview images at a necessary timing to the print output apparatus 105 and the like which prints and outputs the print data. The print output apparatus 105 and the like are configured to obtain the preview images for the necessary minimum pages from the print data storage apparatus 103 at a timing when displaying the document list. Accordingly, the print output apparatus 105 which receives the preview images for the necessary minimum pages can perform the thumbnail display and the preview display to which the print setting is reflected at high speed using the preview image in a limited storage capacity.

According to the above-described first exemplary embodiment, the configuration is described in which the print data storage apparatus 103 stores the preview images of one to N pages and transmits the preview images in response to a request from the print output apparatus 105 or 106. According to a second exemplary embodiment, a configuration is described in which the bibliographic server apparatus stores the preview images of one to N pages generated in the print data storage apparatus 103.

The second exemplary embodiment is different from the above-described first exemplary embodiment in the print data reception processing procedure, the document list and thumbnail display processing procedure, and the data flow. Thus, the different points from the first exemplary embodiment are only described below.

<Print Data Reception Processing Procedure>

FIG. 13 is a flowchart illustrating the print data reception processing procedure of the print data storage apparatus 103 according to the second exemplary embodiment. The processing in the flowchart in FIG. 13 is realized by the CPU 201 of the print data storage apparatus (the multifunction peripheral 103 according to the present exemplary embodiment) executing a program stored in the ROM 203 and the like. The flowchart in FIG. 13 includes steps S1301 to S1318.

The processing contents in steps S1301 to S1316 and S1318 are the same as those in steps S501 to S516 and S517 in FIG. 5A according to the first exemplary embodiment, and thus the descriptions thereof are omitted.

After the processing in step S1316, in step S1317, the application 413 of the print data storage apparatus 103 transmits the preview images for N pages generated in step S1316 to the bibliographic server apparatus 104. When the HDD 204 of the bibliographic server apparatus 104 has a sufficient capacity, the preview images for N pages are transmitted to the bibliographic server apparatus 104 as with the bibliographic data. Accordingly, when a user logs in the print output apparatus 105 or 106, the preview image can be obtained from, the bibliographic server apparatus 104, and the thumbnail display can be performed at high speed. After the processing in step S1317, in step S1318, the application 413 is brought into the event reception waiting state (as with step S517 in FIG. 5A).

<Document List and Thumbnail Display Processing Procedure>

FIG. 14 is a flowchart illustrating the display processing procedures of the document list and the thumbnail of the print output apparatus 105 or 106 according to the second exemplary embodiment. The processing in the flowchart in FIG. 14 is realized by the CPU 201 of the print output apparatus 105 or 106 executing a program stored in the ROM 203 and the like. The flowchart in FIG. 14 includes steps S1401 to S1418.

The processing contents in steps S1401 to S1406 are the same as those in steps S601 to S606 in FIG. 6 according to the first exemplary embodiment, and thus the descriptions thereof are omitted.

After the processing in step S1406, in step S1407, the application 413 obtains the preview image of the document corresponding to the bibliographic data obtained in step S1406 from the bibliographic server apparatus 104 via the network I/F 210 and stores the preview image in the HDD 204.

Next, the application 413 executes the processing in steps S1408 and S1409. The processing contents in steps S1408 and S1409 are the same as those in steps S607 and S608 according to the first exemplary embodiment, and thus the descriptions thereof are omitted.

After the processing in step S1409, in step S1410, the application 413 obtains N pieces of the preview images of the target document from the HDD 204 via the file system 403.

Next, the application 413 executes the processing in steps S1411 to S1418. The processing contents in steps S1411 to S1418 are the same as those in step S614 to S621 in FIG. 6 according to the first exemplary embodiment, and thus the descriptions thereof are omitted.

<Data Flow>

FIG. 15 illustrates an example of a series of data flows according to the second exemplary embodiment which is performed when data is exchanged among three apparatuses, namely the print data storage apparatus 103, the bibliographic server apparatus 104, and the print output apparatus 105. The print output apparatus 105 is used in the description, however, the same can be applied to the print output apparatus 106.

FIG. 15 is different from the data flow in FIG. 12 according to the first exemplary embodiment in the following points.

First, a point is that the print data storage apparatus 103 generates the preview images for N pieces from the received print data and then transmits N pieces of the preview images to the bibliographic server apparatus 104 (step S1504 in FIG. 15). Another point is that the print output apparatus 105 obtains the bibliographic data and N pieces of the preview images from the bibliographic server apparatus 104 and displays the document list and the thumbnail (steps S1505 and S1506 in FIG. 15). The processing is described in detail below.

Step S1503 in FIG. 15 is similar to step 1203 in FIG. 12 according to the first exemplary embodiment, and thus the description thereof is omitted.

In step S1504, the application 413 operating on the CPU 201 of the print data storage apparatus 103 generates the preview images for N pieces from the print data received in step S1503 and transmits N pieces of the generated preview images to the bibliographic server apparatus 104.

In step S1505, the authentication service 409 operating on the CPU 201 of the print output apparatus 105 performs the user authentication, and then the application 413 operating on the CPU 201 of the print output apparatus 105 requests the bibliographic data corresponding to the authenticated user and N pieces of the preview images from the bibliographic server apparatus 104.

In step S1506, the application 413 of the print output apparatus 105 displays the document list and the thumbnail using the bibliographic data and N pieces of the preview images obtained from the bibliographic server apparatus 104. The subsequent data flow is similar to that in FIG. 12, and thus the description thereof is omitted.

As described above, according to the second exemplary embodiment, a hold printing system can realize a thumbnail display function at higher speed in which the image forming apparatus different from the image forming apparatus to which a user transmits print data from the PC and the like can print and output. The second exemplary embodiment is different from the first exemplary embodiment in the aspect that the preview images for the necessary minimum pages generated in advance when the print data is received are also transmitted to the bibliographic server apparatus as with the bibliographic data. According to the configuration, a used storage capacity in the bibliographic server apparatus is increased, however, the print output apparatus can perform the thumbnail display to which the print setting is reflected at higher speed.

As described above, each of the exemplary embodiments of the present invention has the configuration in which the image forming apparatus to which a user inputs print data generates preview images for the necessary minimum pages in advance, (transmits the preview images to the bibliographic server apparatus in the second exemplary embodiment), and the preview images are obtained from the print output apparatus and preview-displayed. According to the configuration, the hold printing system, capable of performing the thumbnail display at high speed can be realized in a server-less environment.

As described above, the configuration which obtains necessary data at a necessary timing can realize the hold printing system in a server-less environment in which the image forming apparatus different from the image forming apparatus storing the print data can perform the thumbnail display and the preview display at high speed without causing memory capacity.

Each of the image forming apparatuses 103 to 106 may be configured to have a first mode for realizing the processing according to the first exemplary embodiment and a second mode for realizing the processing according to the second exemplary embodiment and selectively realize the processing according to the first exemplary embodiment and the processing according to the second exemplary embodiment by switching the modes of each image forming apparatus.

The configurations and contents of the above-described various data pieces are not limited to the above-described embodiments. Various configurations and contents may be adopted according to an application and a purpose thereof.

While exemplary embodiments have been described, other configurations, for example, using the inventive concepts in a system, an apparatus, a method, a program and a storage medium, are also covered by the present disclosure. Among other things, various embodiments may be applied to a system including a plurality of devices or an apparatus including a single device, for example.

Further, configurations which combine the above-described exemplary embodiments are all included within the scope of the present disclosure.

OTHER EMBODIMENTS

Various embodiments can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital-versatile disc (DVD), or Blu-ray Disc (BD™), a flash, memory device, a memory card, and the like.

While exemplary embodiments have been described, the scope of the following claims is to be accorded the broadest interpretation so as to encompass all such modifications and equivalent structures and functions.

This application claims the benefit of Japanese Patent Application No. 2016-029670, filed Feb. 19, 2016, which is hereby incorporated by reference herein in its entirety.

What is claimed is:

1. A first image processing apparatus capable of communicating with a second image processing apparatus storing print data, and using a display unit for displaying information to a user, the first image processing apparatus comprising:
 a controller having a processor which executes instructions stored in a memory, the instructions, when executed, causing the controller to be configured to:
 obtain identification information of print data from a third image processing apparatus;
 obtain image data corresponding to a subgroup of pages of a plurality of pages of the print data from the second image processing apparatus based on the identification information of print data obtained from the third image processing apparatus;
 cause the display unit to execute display processing based on the image data corresponding to the subgroup of pages;
 obtain the print data from the second image processing apparatus after the display processing;

generate image data, based on the print data, of a different page of the plurality of pages from the pages included in the subgroup of pages; and cause the display unit to execute display processing based on the image data of the different page, wherein, in response to receiving the print data that has an attribute of hold designation, the second image processing apparatus generates the image data corresponding to the subgroup of pages on a basis of the print data without printing out the print data, and extracts the identification information from the print data and transmits the identification information to the third image processing apparatus, and wherein each of the first image processing apparatus, the second image processing apparatus, and the third image processing apparatus is either a print data storage apparatus that has a printer unit or a print output apparatus that has a printer unit.

2. The first image processing apparatus according to claim 1, wherein
the controller obtains identification information pieces of a plurality of print data pieces from the third image processing apparatus and causes the display unit to display a selection screen for print data based on the identification information pieces of the plurality of print data pieces.

3. The first image processing apparatus according to claim 2, further comprising:
an image forming unit configured to form an image on a sheet based on print data, and
wherein the controller arranges an instruction object for causing the image forming unit to form an image based on selected print data on the selection screen.

4. The first image processing apparatus according to claim 3, wherein
in a case where print data which is instructed to be printed is already obtained, the controller causes the image forming unit to form an image based on the obtained print data, and in a case where print data which is instructed to be printed is not yet obtained, the controller makes an obtainment request for print data, receives the print data, and then causes the image forming unit to form an image based on the received print data.

5. The first image processing apparatus according to claim 2, wherein
the controller arranges a thumbnail image on the selection screen based on the image data of the subgroup of pages.

6. The first image processing apparatus according to claim 5, wherein
the thumbnail image is an image based on a plurality of image data pieces.

7. The first image processing apparatus according to claim 5, wherein
the controller obtains print setting information of the print data and obtains the thumbnail image based on the print setting information and the image data of the subgroup of pages.

8. The first image processing apparatus according to claim 2, wherein
the controller arranges a preview instruction object for instructing preview of the selected print data on the selection screen.

9. The first image processing apparatus according to claim 8, wherein
the controller causes the display unit to display a preview screen based on image data corresponding to the selected print data according to a preview instruction by a user.

10. The first image processing apparatus according to claim 8, wherein
the controller arranges an instruction object for causing the image forming unit to form an image based on the selected print data on the preview screen.

11. The first image processing apparatus according to claim 8, wherein
the controller obtains print data from the second image processing apparatus according to a preview instruction by a user.

12. The first image processing apparatus according to claim 2, wherein
the controller obtains the image data corresponding to the subgroup of pages according to a display request of the selection screen.

13. The first image processing apparatus according to claim 1, wherein
the controller obtains the image data corresponding to the subgroup of pages from the second image processing apparatus.

14. The first image processing apparatus according to claim 1, wherein
the controller obtains the identification information from the third image processing apparatus.

15. The first image processing apparatus according to claim 14, wherein
the controller obtains the image data corresponding to the subgroup of pages from the third image processing apparatus.

16. The first image processing apparatus according to claim 1, wherein
the subgroup of pages comprises a predetermined number of pages arranged in order from a start page.

17. The first image processing apparatus according to claim 1, wherein
the controller obtains images of all pages based on the print data.

18. The first image processing apparatus according to claim 1, wherein
the display unit is a terminal provided connectable to the first image processing apparatus.

19. The first image processing apparatus according to claim 18, wherein
the terminal is a wireless terminal which connects to the first image processing apparatus via wireless communication.

20. A method for controlling a first image processing apparatus capable of communicating with a second image processing apparatus storing print data, the first image processing apparatus using a display unit for displaying information to a user, the method comprising:
obtaining identification information of print data from a third image processing apparatus;
obtaining image data corresponding to a subgroup of pages of a plurality of pages of the print data from the second image processing apparatus based on the identification information of print data obtained from the third image processing apparatus;
causing the display unit to display an image based on the image data corresponding to the subgroup of pages;
obtaining the print data from the second image processing apparatus;

generating image data, based on the print data, of a different page of the plurality of pages from the pages included in the subgroup of pages; and causing the display unit to display an image based on the image data of the different page, wherein, in response to receiving the print data that has an attribute of hold designation, the second image processing apparatus generates the image data corresponding to the subgroup of pages on a basis of the print data without printing out the print data, and extracts the identification information from the print data and transmits the identification information to the third image processing apparatus, and wherein each of the first image processing apparatus, the second image processing apparatus, and the third image processing apparatus is either a print data storage apparatus that has a printer unit or a print output apparatus that has a printer unit.

21. A non-transitory storage medium storing a program for causing a computer to execute a method for controlling a first image processing apparatus capable of communicating with as second image processing apparatus storing print data, the first image processing apparatus using a display unit for displaying information to a user, the method comprising:

obtaining identification information of print data from a third image processing apparatus;

obtaining image data corresponding to a subgroup of pages of a plurality of pages of the print data from the second image processing apparatus based on the identification information of print data obtained from the third image processing apparatus;

causing the display unit to display an image based on the image data corresponding to the subgroup of pages;

obtaining the print data from the second image processing apparatus;

generating image data, based on the print data, of a different page of the plurality of pages from the pages included in the subgroup of pages; and causing the display unit to display an image based on the image data of the different page, wherein, in response to receiving the print data that has an attribute of hold designation, the second image processing apparatus generates the image data corresponding to the subgroup of pages on a basis of the print data without printing out the print data, and extracts the identification information from the print data and transmits the identification information to the third image processing apparatus, and wherein each of the first image processing apparatus, the second image processing apparatus, and the third image processing apparatus is either a print data storage apparatus that has a printer unit or a print output apparatus that has a printer unit.

* * * * *